United States Patent [19]
Hopkinson et al.

[11] Patent Number: 6,081,821
[45] Date of Patent: Jun. 27, 2000

[54] PIPELINED, HIGH-PRECISION FAST FOURIER TRANSFORM PROCESSOR

[75] Inventors: Thomas M. Hopkinson, Malden; G. Michael Butler, Cambridge, both of Mass.

[73] Assignee: The Mitre Corporation, Bedford, Mass.

[21] Appl. No.: 08/102,562

[22] Filed: Aug. 5, 1993

[51] Int. Cl.[7] ............................. G06F 15/00; G06F 17/14
[52] U.S. Cl. ........................ 708/406; 708/404; 708/409
[58] Field of Search ................................... 364/726, 725, 364/727; 708/403, 404, 405, 406, 408, 409

[56] References Cited

U.S. PATENT DOCUMENTS 4,501,149  2/1985  Konno et al. .............................. 73/587
5,038,311  8/1991  Monastra et al. ....................... 364/726

OTHER PUBLICATIONS

Santoro et al., "SPIM: A pipelined 64×64-bit iterative multiplier," IEEE, vol. 24, No. 2, Apr. 1989.

*Primary Examiner*—Emmanuel L. Moise
*Attorney, Agent, or Firm*—Choate, Hall & Stewart

[57] ABSTRACT

The Fast Fourier Transform (FFT) processor includes a plurality of pipelined, functionally identical stages, each stage adapted to perform a portion of an FFT operation on a block of data. The output of the last stage of the processor is the high-precision Fast Fourier Transform of the data block. Support functions are included at each stage. Thus, each stage includes a computational element and a buffer memory interface. Each stage also includes apparatus for coefficient generation.

8 Claims, 32 Drawing Sheets

FIG.6

| Xi | | REAL ARRAY | | IMAG ARRAY | |
|---|---|---|---|---|---|
| R(X) | IM(X) | DS | ASC | DS | ASC |
| 0 | 0 | 0 | 0 | 1 | 0 |
| 1 | 0 | 1 | 1 | 0 | 0 |
| 0 | 1 | 1 | 0 | 0 | 1 |
| 1 | 1 | 0 | 1 | 1 | 1 |

| X msb | | REAL ARRAY | | IMAG ARRAY | |
|---|---|---|---|---|---|
| R(X) | IM(X) | DS | ASC | DS | ASC |
| 0 | 0 | 0 | 1 | 1 | 1 |
| 1 | 0 | 1 | 0 | 0 | 1 |
| 0 | 1 | 1 | 1 | 0 | 0 |
| 1 | 1 | 0 | 0 | 1 | 0 |

FIG.7

| DS | ASC | ADD |
|---|---|---|
| 0 | 0 | $-K'$ |
| 0 | 1 | $K'$ |
| 1 | 0 | $-K$ |
| 1 | 1 | $K$ |

FIG.19

| FIG.19-1 | FIG.19-2 |
| FIG.19-3 | | FIG.19-4 |
| FIG.19-5 | FIG.19-6 |

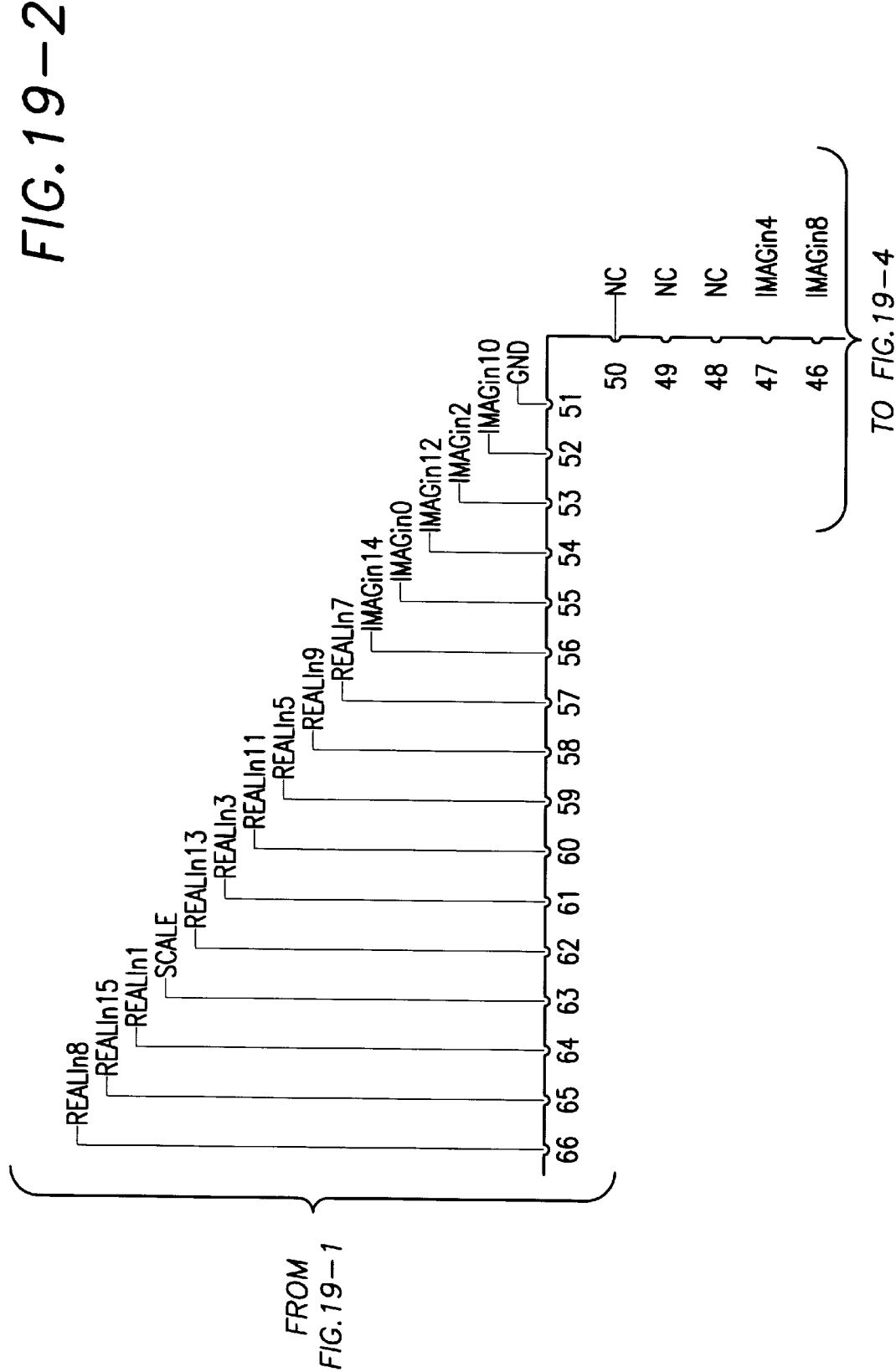

FIG. 19-3

FROM FIG.19-1

| | |
|---|---|
| REALout8 | 89 |
| IMAGout9 | 90 |
| OE̅ | 91 |
| REALout1 | 92 |
| IMAGout1 | 93 |
| REALout3 | 94 |
| IMAGout3 | 95 |
| REALout5 | 96 |
| GND | 97 |
| GND | 98 |
| GND | 99 |
| GND | 100 |
| Vdd | 101 |
| Vdd | 102 |
| IMAGout5 | 103 |
| REALout0 | 104 |
| IMAGout0 | 105 |
| REALout2 | 106 |
| IMAGout2 | 107 |
| REALout4 | 108 |
| IMAGout4 | 109 |
| REALout5 | 110 |
| IMAGout5 | 111 |

FROM FIG.19-2

| Pin | Signal |
|---|---|
| 45 | IMAGin6 |
| 44 | IMAGin15 |
| 43 | IMAGin1 |
| 42 | IMAGin13 |
| 41 | IMAGin3 |
| 40 | IMAGin11 |
| 39 | IMAGin5 |
| 38 | IMAGin9 |
| 37 | IMAGin7 |
| 36 | GND |
| 35 | GND |
| 34 | GND |
| 33 | Vdd |
| 32 | Vdd |
| 31 | Vdd |
| 30 | PH1 |
| 29 | PH2 |
| 28 | STAGE 0 |
| 27 | STAGE 1 |
| 26 | STAGE 2 |
| 25 | FOR_NV |
| 24 | M1 |
| 23 | M0 |

TO FIG.19-6

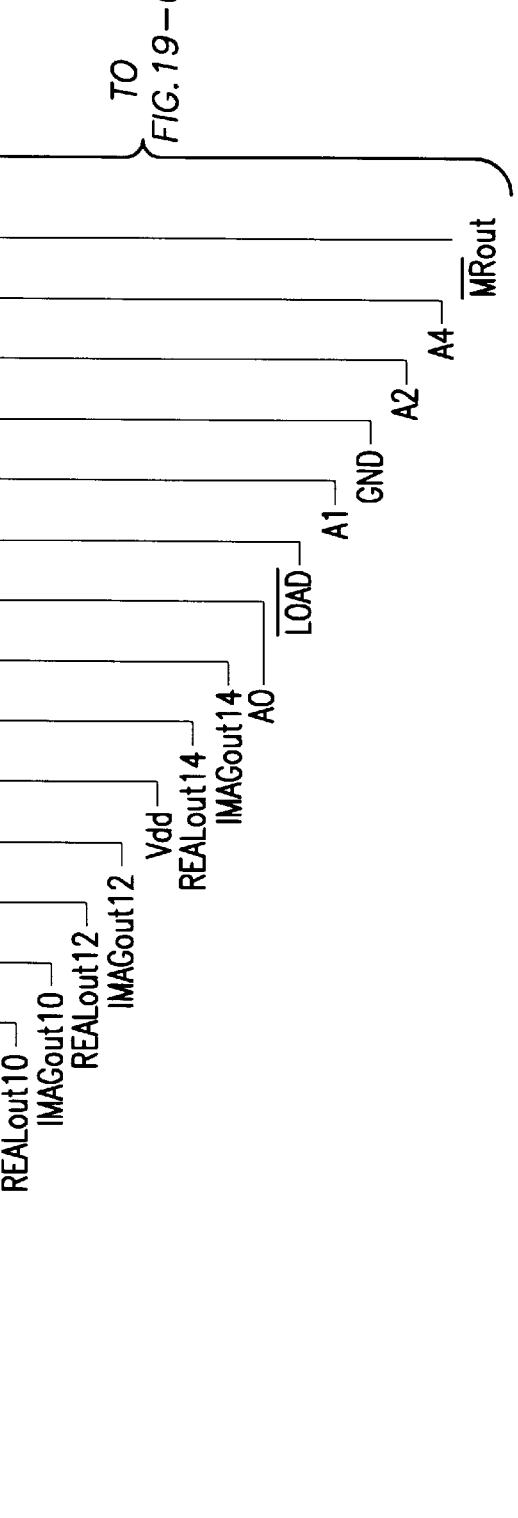

PIPELINED, HIGH-PRECISION FAST FOURIER TRANSFORM PROCESSOR

BACKGROUND

The present invention relates to a highly integrated, high-precision fast Fourier transform (FFT) processor architecture.

The fast Fourier transform class of operations is widely used in communication and sensor signal processing. See for example, Oppenheim, A. V. and R. W. Schafer, 1975, *Digital Signal Processing,* NJ: Prentice-Hall. Several communication and sensor applications require very high precision (32-bit) real-time Fourier transforms of large (64K-point), complex data blocks. One such application is a high-frequency, spread spectrum communication system such as that described by Perry, B. D., E. A. Palo, R. D. Haggarty, and E. L. Key, 1987, "Trade-off Considerations in the Use of Wideband HF Communications," In *Proceedings IEEE International Conference on Communications,* Volume 2, pages 0930–0940. Radar systems designed to detect small cross-sectional targets are similarly demanding applications. Although the prior art FFT algorithm is readily implemented with commercial digital signal processing (DSP) components, those components lack either the throughput or precision required for such demanding applications.

There are essentially three prior art approaches available for constructing FFT processors from commercially available integrated circuits. A first approach uses a programmable DSP component such as the TMS320. A second approach uses the commercially available "single-chip" FFT processors and a third approach constructs an FFT processor from available arithmetic components such as multipliers, adders, etc.

Programmable DSP components, such as the TMS320, provide high-precision computation in a very flexible form. Their flexibility and performance have allowed these programmable components to subsume many DSP applications. However, their flexibility comes at the expense of throughput; the DSP chips are not well suited to real-time computation at modest or high throughput rates.

An alternative to programmable DSP components is commercial "single-chip" FFT processors. These components meet the throughput requirements of high performance applications, but they lack the necessary precision. Many such components provide only 16 bits of precision, while a few others offer 24 bits. Further, these "single-chip" processors typically require a large number of supporting components; in particular, address generators and coefficient memories are not incorporated on-chip. Finally, processor throughput and FFT block size are tightly coupled in these processors; larger blocks are typically processed at lower throughput rates.

The third approach is the construction of a high-precision FFT processor from commercially available "building blocks" such as high-performance arithmetic components. This approach provides both precision and performance but the resulting system is large and inflexible. Using this prior art approach, the inventors herein constructed a 32 bit, 16K-point FFT which required nearly 300 components and could not be readily extended to larger block sizes or throughput rates.

SUMMARY OF THE INVENTION

The fast Fourier transform (FFT) processor of the invention includes a plurality of pipelined, functionally identical stages, each stage adapted to perform a portion of an FFT operation on a block of data. The output of the last stage of the processor is the high-precision fast Fourier transform of the data block. Support functions are included at each stage. Thus, each stage includes a computational element and a buffer memory interface. In one embodiment, the memory buffer interface is a commercial static random-access memory (SRAM). Each stage also includes apparatus for coefficient generation.

The application-specific integrated circuits (ASICs) which implement the present invention allow flexible, high-precision, high-performance FFT processors to be realized. Unlike prior art commercial FFT offerings, the processor of the present invention incorporates all FFT support functions—including coefficient and memory-address generation—on a single die. Additionally, the processor of the invention computes the FFT to full 32-bit precision, significantly greater precision than currently available with commercial processors. This implementation operates with a continuous complex-data rate of 4 million samples-per-second and can be cascaded to provide up to 64K-point transforms. The architecture is easily extensible to a 20 million samples-per-second processor with no compromise in precision or block length. These parameters are not limits of the architecture of the processor but reflect current embodiments of this invention.

BRIEF DESCRIPTION OF THE DRAWINGS

FIG. 7 is a diagram illustrating distributed arithmetic mux selection.

DESCRIPTION OF THE PREFERRED EMBODIMENT

As is well known in the prior art, the discrete Fourier transform, X[k], of a series of N samples x[n] is given by $$X[k] = \sum_{n=0}^{N-1} x[n] e^{-j2\pi nk/N}$$

Figure 1:
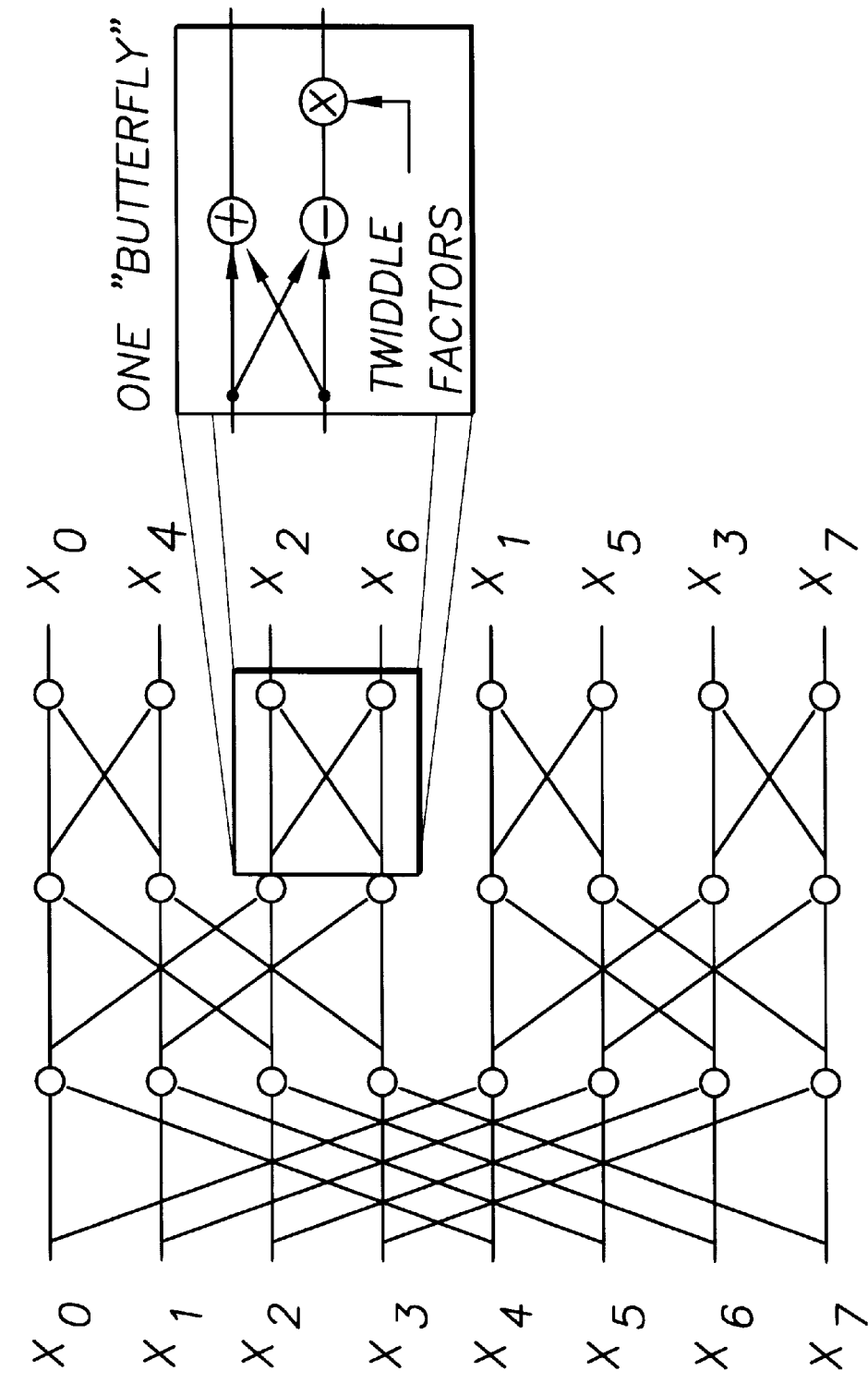
FIG. 1 is a signal flow graph illustrating the radix-r FFT computation scheme of the invention.

The computation of a block of length N requires $O(N^2)$ arithmetic operations. A radix-r fast Fourier formulation of this calculation reduces this number to $O(N \log_2 N)$ arithmetic operations in $\log_r N$ stages. In a radix-r FFT, the discrete Fourier transform (DFT) is decomposed into r-point DFT computations and multiplications by rotational vectors or "twiddle factors." These two computations combine to form the fundamental radix-r computational element, or "butterfly." The interconnection of these butterflies, which are identical except for the value of the twiddle factors, constructs a radix-r FFT. This computation is suggested in FIG. 1 for r=2.

Commercial "single-chip" FFT processors generally provide all $O(N \log_2 N)$ operations in a single component. This procedure is advantageous in situations where N is relatively small and the throughput rates are low. In such a case, the computational elements, or "butterfly," 10 can easily be time multiplexed. For larger values of N, this approach is viable only if a decrease in throughput can be tolerated (i.e., in a "single-chip" processor, throughput and block length are inversely proportional). This architecture requires a very fast butterfly 10, but compromises integration—all available silicon area is devoted to the butterfly 10, and none can be spared for support functions. In addition, the architecture's I/O bandwidth requirements scale with increasing N. Typically, this increased bandwidth is provided by additional signal pins on the processor chip and places stringent bandwidth requirements on the buffer memories as well. It is easily seen, then, that this "single-chip" prior art architecture offers high performance at the expense of precision and integration—support functions such as coefficient generation and memory addressing must be provided off-chip.

The approach of the present invention is to partition the $O(N \log_2 N)$ arithmetic operations among $\log_r N$ processors for the radix-r FFT. This scheme reduces the computational and I/O requirements of the processor by a factor of $\log_r N$ and effectively decouples block length and throughput. At first, this approach seems unappealing since it requires $\log_r N$ processors, but, surprisingly, this approach does provide a smaller overall system. It is this approach that the present invention is built upon.

Reduced processing and I/O requirements allow greater architectural flexibility. To improve precision and integration, the silicon area devoted to the butterfly 10 processing components is reduced. Reduction is accomplished by the application of digit-serial arithmetic and iterative multiplication architectures whenever possible. See, for example, Hartley, R. and P. Corbett, June 1990, "Digit-Serial Processing Techniques," IEEE *Transactions on Circuits and Systems*, Vol. 37, No. 6, pp. 707–719 and Santoro, M. R. and M. A. Horowitz, April 1989, "SPIM: A Pipelined 64×64-bit Iterative Multiplier," IEEE *Journal of Solid-State Circuits*, Vol. 24, No. 2, pp. 487–493 for a discussion of digit-serial arithmetic and iterative multiplication architectures respectively. An additional area savings is realized by the application of a distributed arithmetic multiplier architecture as discussed in MacTaggart, I. R. and M. A. Jack, June 1984, "A Single Chip Radix-2 FFT Butterfly Architecture Using Parallel Data Distributed Arithmetic," IEEE *Journal of Solid-State Circuits*, Vol 19, No. 3 pp. 368–373. The multiplier architecture will be described in detail below. These techniques enable a butterfly 10 data path that provides high precision processing in a very modest area. Radix-2 and radix-4 implementations according to the invention incorporate a 32-bit complex FFT butterfly and all support functions—including a 42-bit complex coefficient generator and a buffer memory interface—on a single die.

Figure 2:
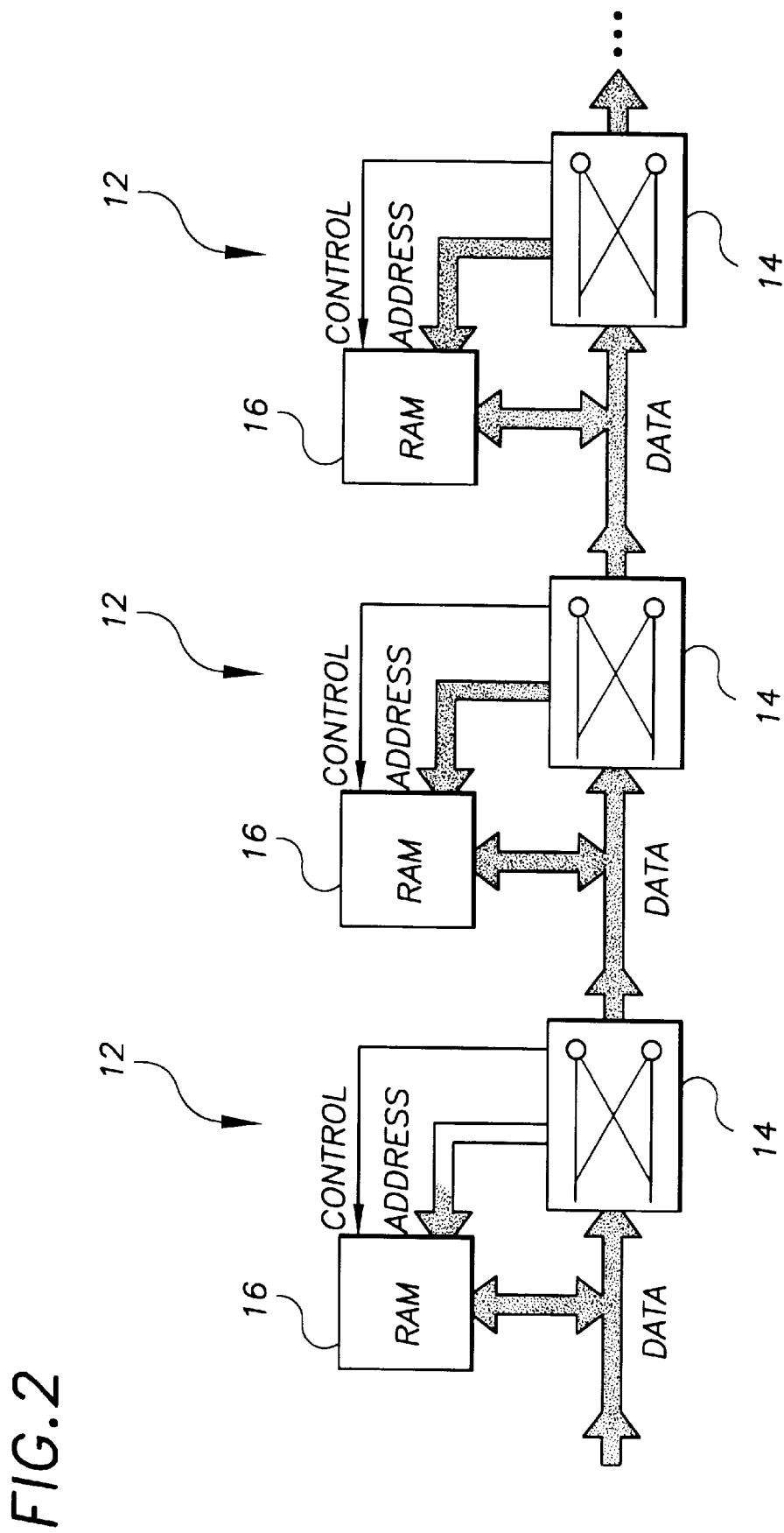
FIG. 2 is a block diagram of the pipelined fast Fourier transform system according to the present invention.

A radix-4 implementation according to the invention will now be described. The radix-4 FFT of an N-point data block consists of $\log_4 N$ stages of processing. At each stage, groups of four data samples are gather-read from the input memory buffer, operated on, and scatter-written to the output buffer. Each interstage memory serves as output buffer for one processor and input buffer to the next. As shown in FIG. 2, transforms of length of $N=4^n$, $N \leq 64K$, are constructed by cascading n identical stages 12, each stage 12 including a programmable processor chip 14 and one commercial static random-access memory (SRAM) 16. Note that the FFT chips 14 implement a unidirectional pipeline; the double-buffered memories traditionally associated with the FFT computation are not required. The interstage memories 16 allow the reordering of data as it progresses through the pipeline. Two points should be noted with respect to FIG. 2. First, since the FFT chips 14 are programmable, a single design can serve as any stage of a forward or inverse FFT. Second, since all support functions are included on-chip, no ancillary control or support devices are needed; there are no coefficient ROMS, no external address generators, and no memory controllers required. The result is a simple, regular FFT system implemented with precisely two integrated circuit types: a commercially available SRAM 16 module and the custom FFT processor 14 to be described herein.

Figure 3:
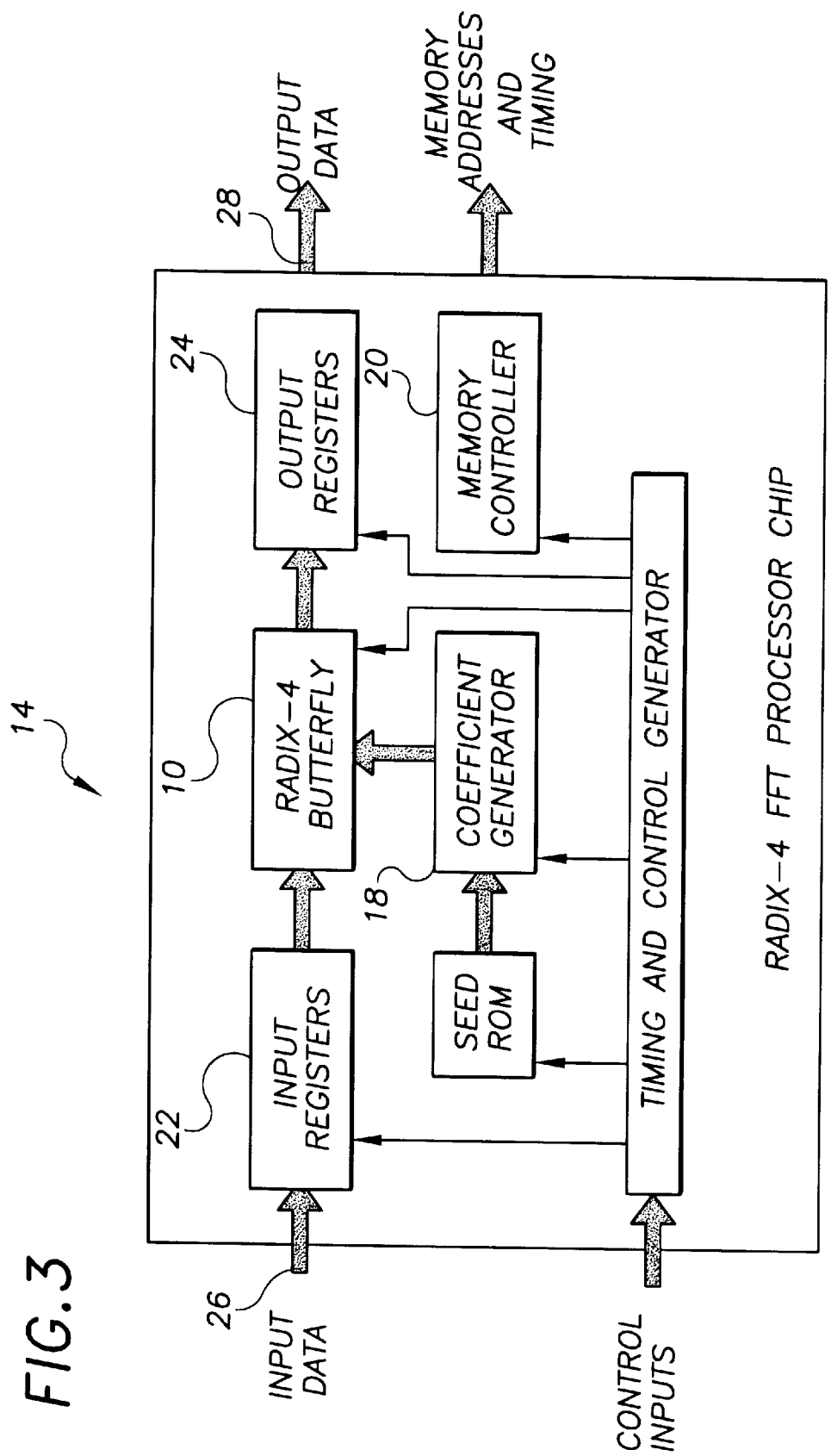
FIG. 3 is a block diagram of a Radix-4 FFT processor according to the invention.

FIG. 3 shows a block diagram of the radix-4 decimation-in-frequency FFT integrated circuit 14. In addition to the butterfly 10 arithmetic components, FIG. 3 shows a coefficient generator 18 which calculates root-of-unity "twiddle factors," and a buffer-memory controller 20. Input and output registers 22 and 24 convert between an on-chip digit-serial data format and the word-parallel format used for chip-to-memory communication.

Prior to each calculation, a four-tuple, (a, b, c, d), is transferred from the buffer memory to the processor 14 input registers 22. Together, these values represent 256 bits of data and are transferred over a 32-bit input data bus in eight memory read cycles. In a forward FFT, the radix-4 butterfly 10 computes a new vector, (a', b', c' d'), given by:

$$a'=a+b+c+d,$$
$$b'=(a-jb-c+jd)(e^{-j2\pi/N})^{nk},$$
$$c'=(a-b+c-d)(e^{-j2\pi/N})^{n2k},$$
$$d'=(a+jb-c-jd)(e^{-j2\pi/N})^{n3k}.$$

The computation of the inverse FFT is the complex conjugate of the above equations.

The input registers 22 provide the synchronization of input data 26 required for these computations. Each of the values a, b, c, and d is clocked out of the input registers as a stream of quaternary digits and fed to the appropriate adder/subtracter combination (not shown) in the butterfly 10. Operating on two-bit digits represents a compromise between the area efficiency of bit-serial computation and the speed of parallel computation. The outputs of the digits-serial adders and subtractors, themselves quaternary streams, are buffered for time-division multiplexing through a single complex multiplier (not shown). The size of the high precision complex multiplier prevents its replication and, therefore, mandates the use of time-division multiplexing. (Notice that a requires no rotation, so the multiplier need only be multiplexed between the three remaining data items.) The buffered data is synchronized with the on-chip coefficient generator 18, and the pair of values, data and coefficient, is fed to the multiplier. The multiplier's outputs are captured and reformatted in the output registers 24. Reformatting is primarily a conversion from the on-chip digit-serial quaternary representation to the parallel inter-chip format. The resulting values are gated to an output data bus 28 and written as eight 32-bit quantities to the interstage buffer memory.

Since the multiplier processes three sets of operands per butterfly 10, its performance determines the chip's overall throughput rate. This fact presents a significant design challenge. On the one hand, there is the need to minimize the multiplier's size to allow higher precision calculation and better integration, while on the other hand, the multiplier's size determines its throughput.

Figures 1, 4:
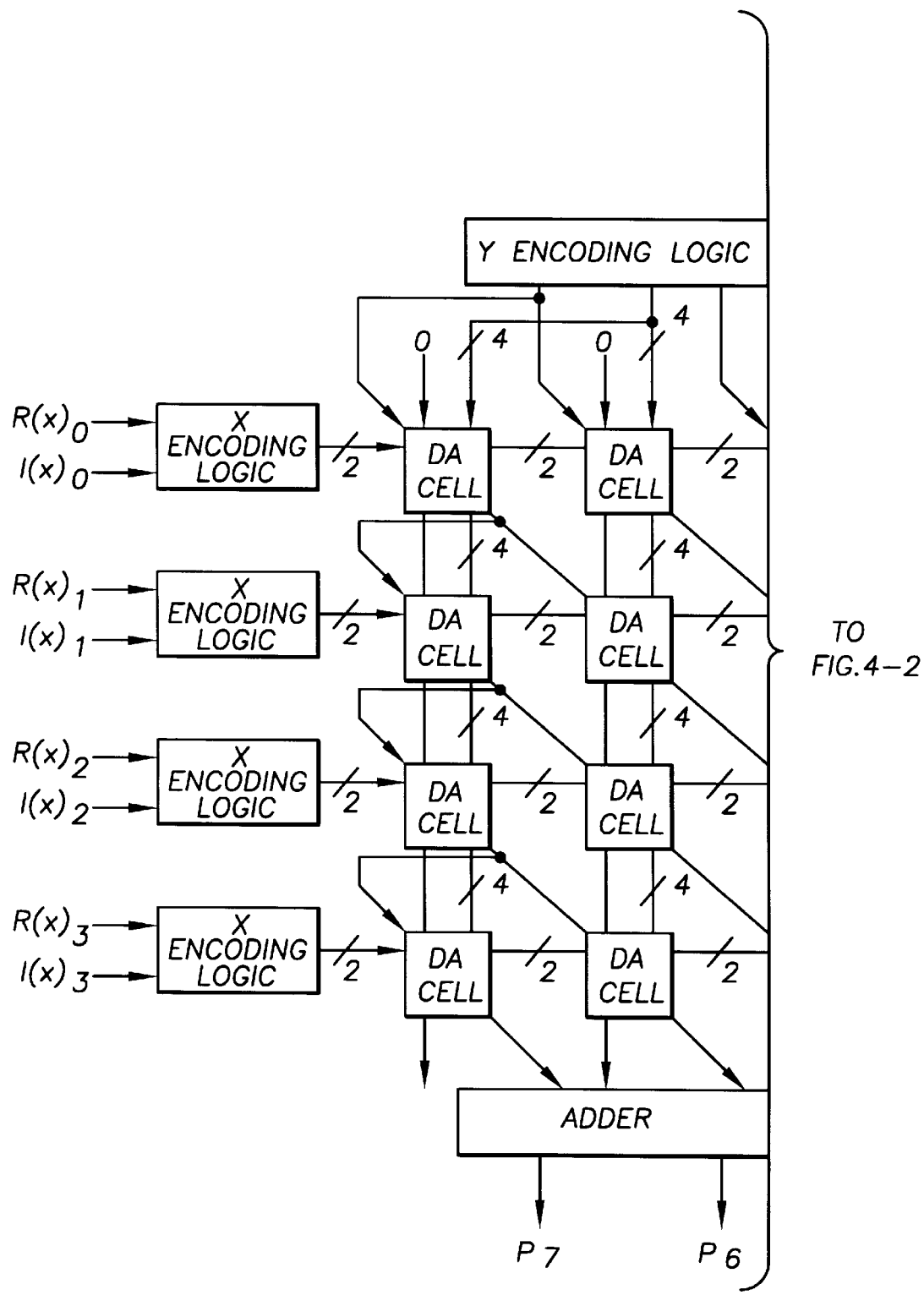
FIG. 4 is a block diagram of a distributed arithmetic flash multiplier.
Figures 2, 4:
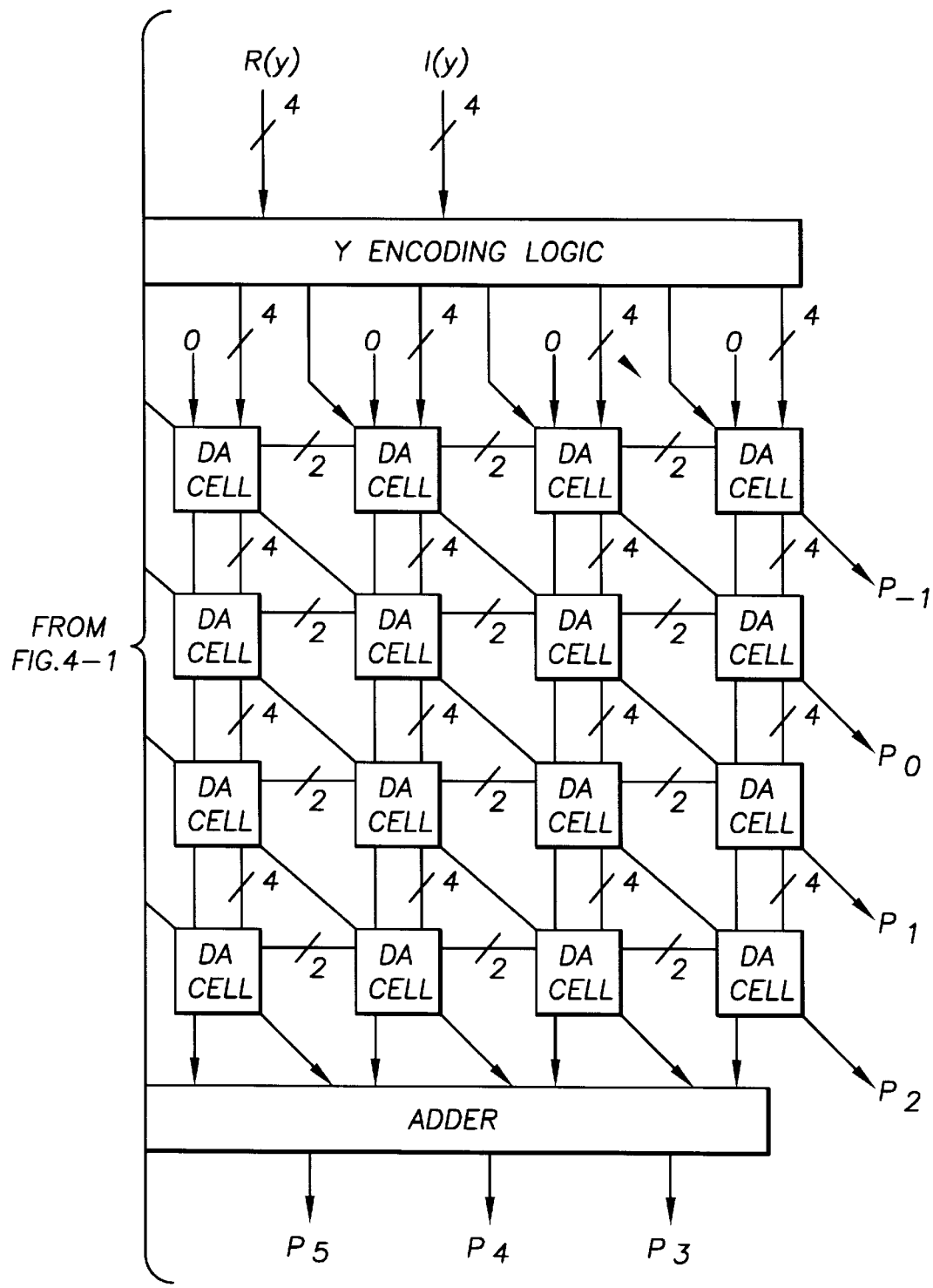
Figure 5:
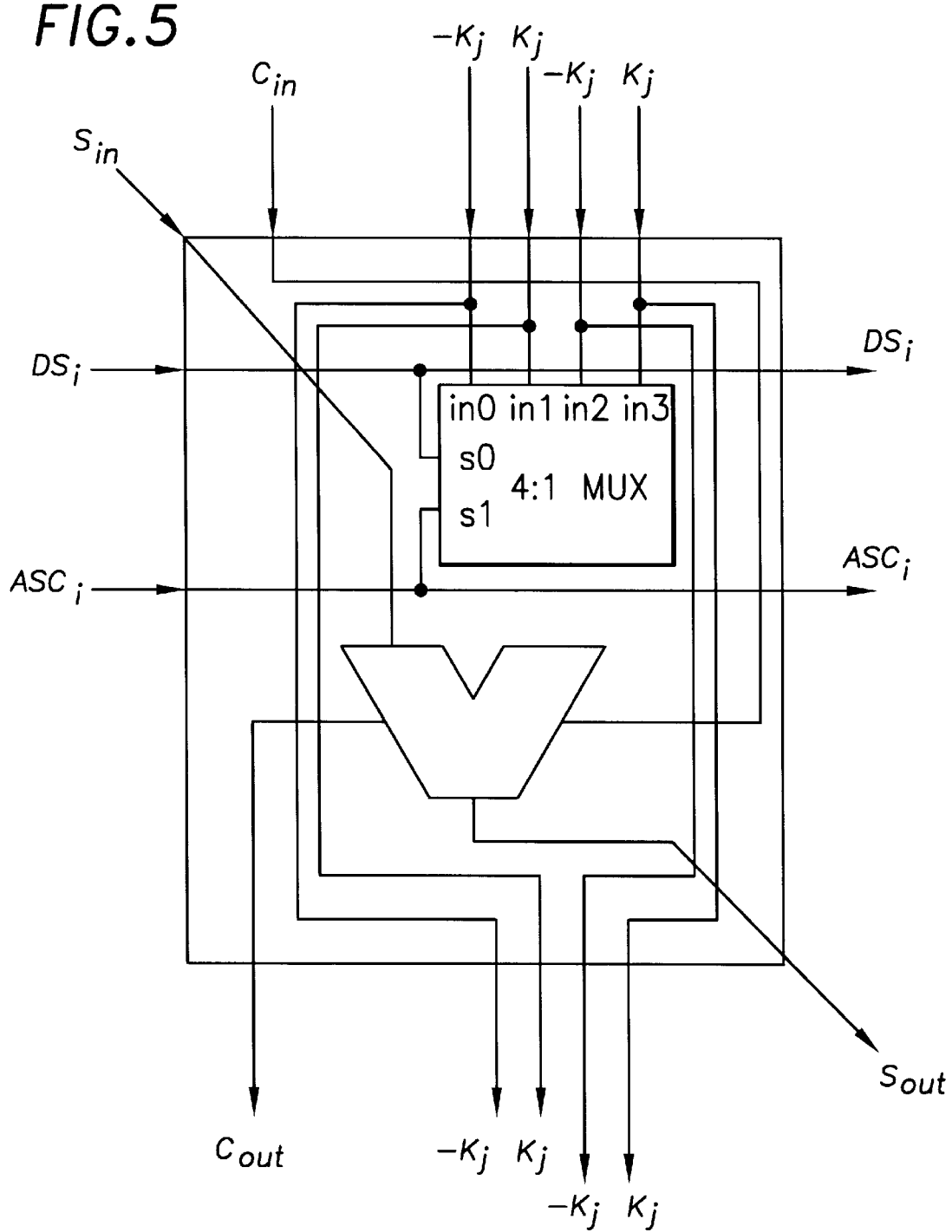
FIG. 5 is a schematic illustration of a distributed arithmetic multiplier cell.

The multiplier utilized in an implementation of the processor of the invention is an adaptation of the distributed arithmetic (DA) architecture suggested by McTaggart et al. referred to above. Mactaggart et al. initially proposed a "flash" multiplier architecture based on the commonly known carry-save-adder (CSA) approach. In this scheme, an n×n-bit multiplier requires n rows and n+2 columns of computational cells to compute either the real or imaginary part of an n×n complex multiplication. The requirement for the two extra columns will be described below. A 4×4 multiplier array example is shown in FIG. 4. Two similar arrays may be combined to compute both the real and imaginary components of the complex product of x and y. The internals of each of the DA computational cells are shown in FIG. 5. In FIG. 5, the values K and K' are defined by the y encoding logic as:

$K=R(y)+I(y)$, $K'=R(y)-I(y)$ where R(y) and I(y) are the real and imaginary parts of the complex quantity y. In the original DA algorithm, the definitions of K and K' were defined a bit differently; they were defined as one-half the sum and difference of the real and imaginary terms. For a division by two, we shift right one bit and round off at the binary point before truncating all bits to its right. The error generated by this rounding decreases as the number of points to the right of the binary point increases. In order to minimize this truncation error, we have chosen to postpone this division until the computation of the 64-bit product is completed. Since the multiplication operation is merely an accumulation involving K and K', the final product may then be divided by two to yield the desired result, that is, we exploit the distributive law of multiplication over addition to produce a more accurate result. This affords us a much more accurate division, since the double precision (2n-bit) product will now contain n bits to the right of the binary point as opposed to one bit in the K and K' values. This modification to the original DA architecture requires the inclusion of one extra column in the multiplier to contain the expanded values.

Figures 1, 19:
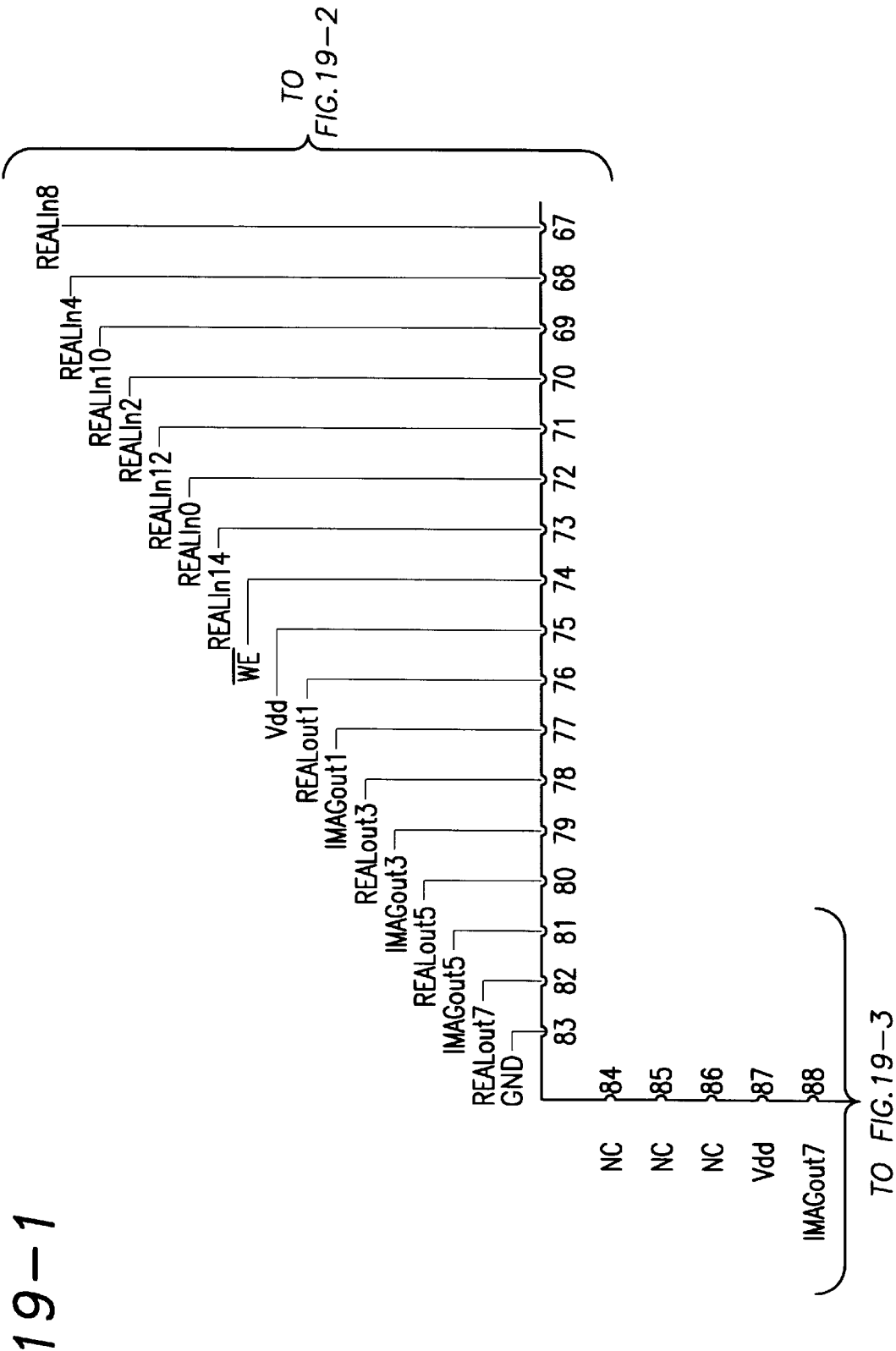
FIG. 19 is a diagram illustrating the pin configuration of the radix-4 FFT butterfly processor of the invention.
Figures 6, 19:
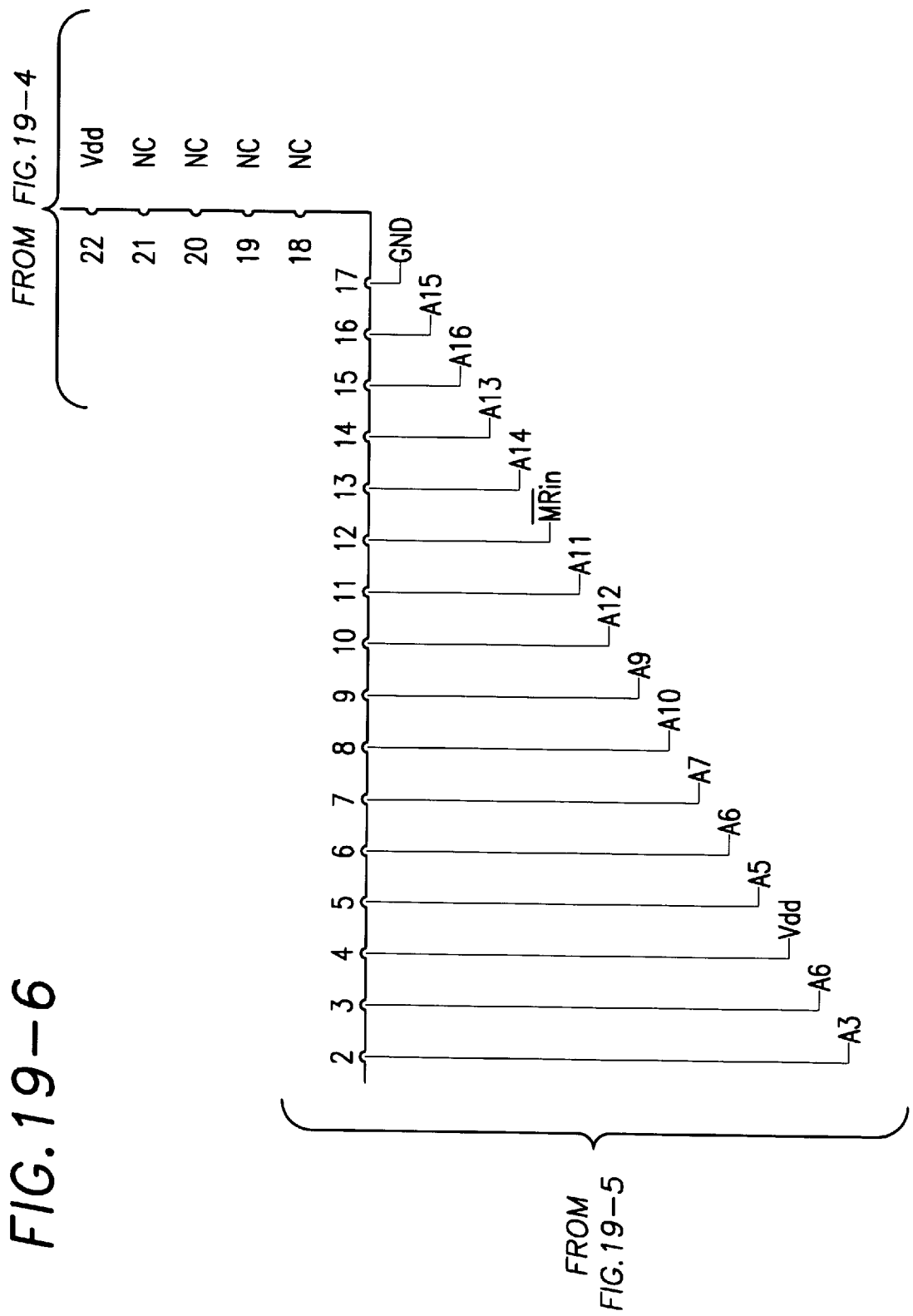
FIG. 6 is a diagram of distributed arithmetic encoding logic.

In each row of the multiplier, one bit of the real component and one bit of the imaginary component of x are encoded to produce the control signals data_select (DS) and add_substract_control (ASC), as shown in FIG. 6. Since one instance of the DA multiplier computes either the real or imaginary portion of the result, two multipliers with slightly different encodings are necessary. Also, since the sign bit of a two's complement number carries a negative weight, the sense of the ASC signal must be inverted for the most significant row of the multiplier. The two signals, DS and ASC, control a 4:1 mux that selects one of the four values (K, −K, K', or −K') to be added to the partial product at that particular row of the multiplier array. The truth table for the mux is shown in FIG. 7.

One advantage of the DA multiplication algorithm of the invention over alternative algorithms is that it operates on two's complement values and produces two's complement results. This eliminates the need to convert from two's complement to sign-magnitude representation, a requirement in many other multiplier architectures. In order to maintain the sign information of the partial products, an additional column has been added at the left of the array, as shown in FIG. 4, to perform sign extension.

Our implementation of the DA multiplier uses the carry-save-adder configuration popular in many other multiplier architectures. As with any carry-save array, a second stage of accumulation, a "carry-ripple" stage, is required to compute the final product. This stage combines the sums and carries generated by the bottom row of the CSA array and produces the most significant bits of the product. Although the DA multiplier array is more complicated than a conventional carry-save array, only two arrays are necessary to compute a complex product, as opposed to the typical four multiplier/two adder implementation. In fact, the DA multiplier requires roughly 60 percent of the area required by either the conventional multiplier or the more popular modified Booth's multiplier. However, in a "flash" implementation, the modified Booth's multiplier is faster.

One of our most significant enhancements to the DA multiplier architecture is the conversion of the flash array to a smaller "iterative" architecture. Iterative multiplication architectures are a logical extension of the more common bit-serial or digit-serial design techniques. These serialized computation techniques are applicable in cases where the size of the circuit area is critical and throughput requirements are moderate.

The DA architecture, being implemented as a carry-save adder, is particularly well suited to pipelining. In the carry-save implementation of FIG. 4, the results of the first row must enter (or ripple to) the second row, whose outputs ripple to the third and so on down the array. A significant throughput advantage may be realized by placing registers between rows (pipelining) and latching the partial products as they pass down through the array. If the x inputs are staggered as shown in FIG. 8, several multiplications may be active in the array simultaneously and the throughput is equivalent to that of one computational row.

Figures 1, 8:
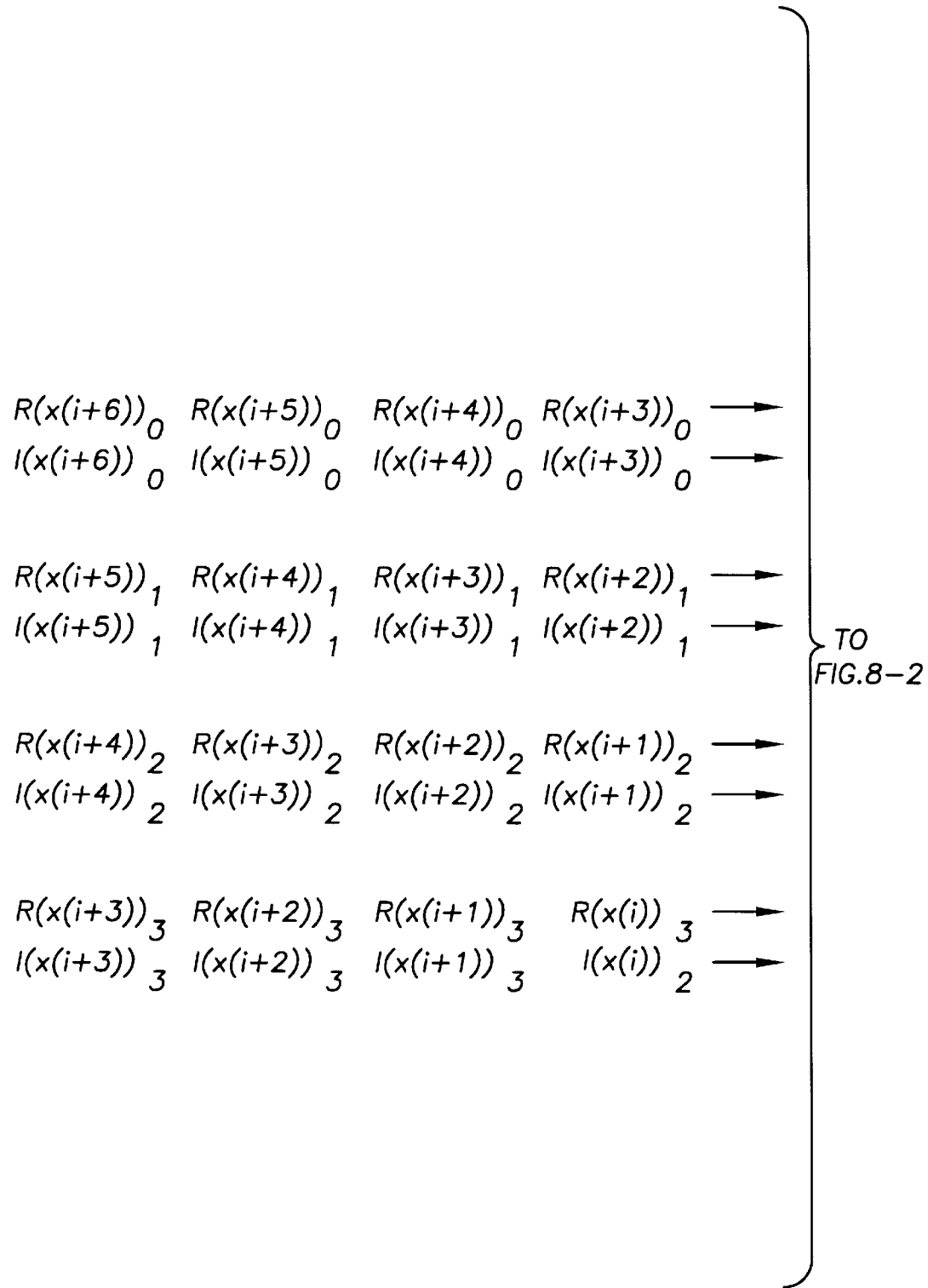
FIG. 8 is a block diagram of the pipelined distributed arithmetic multiplier of the invention.
Figures 2, 8:
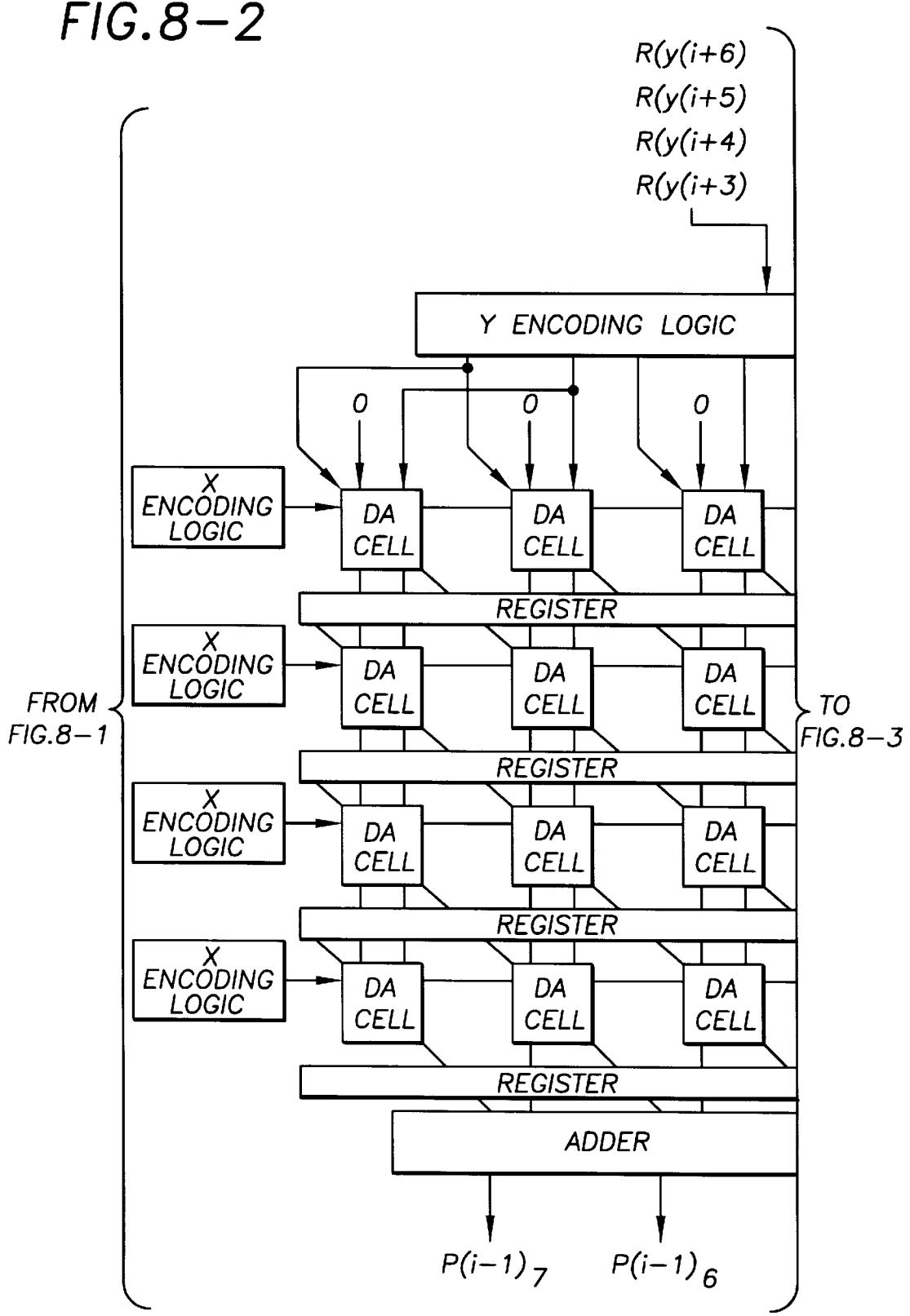
Figures 3, 8:
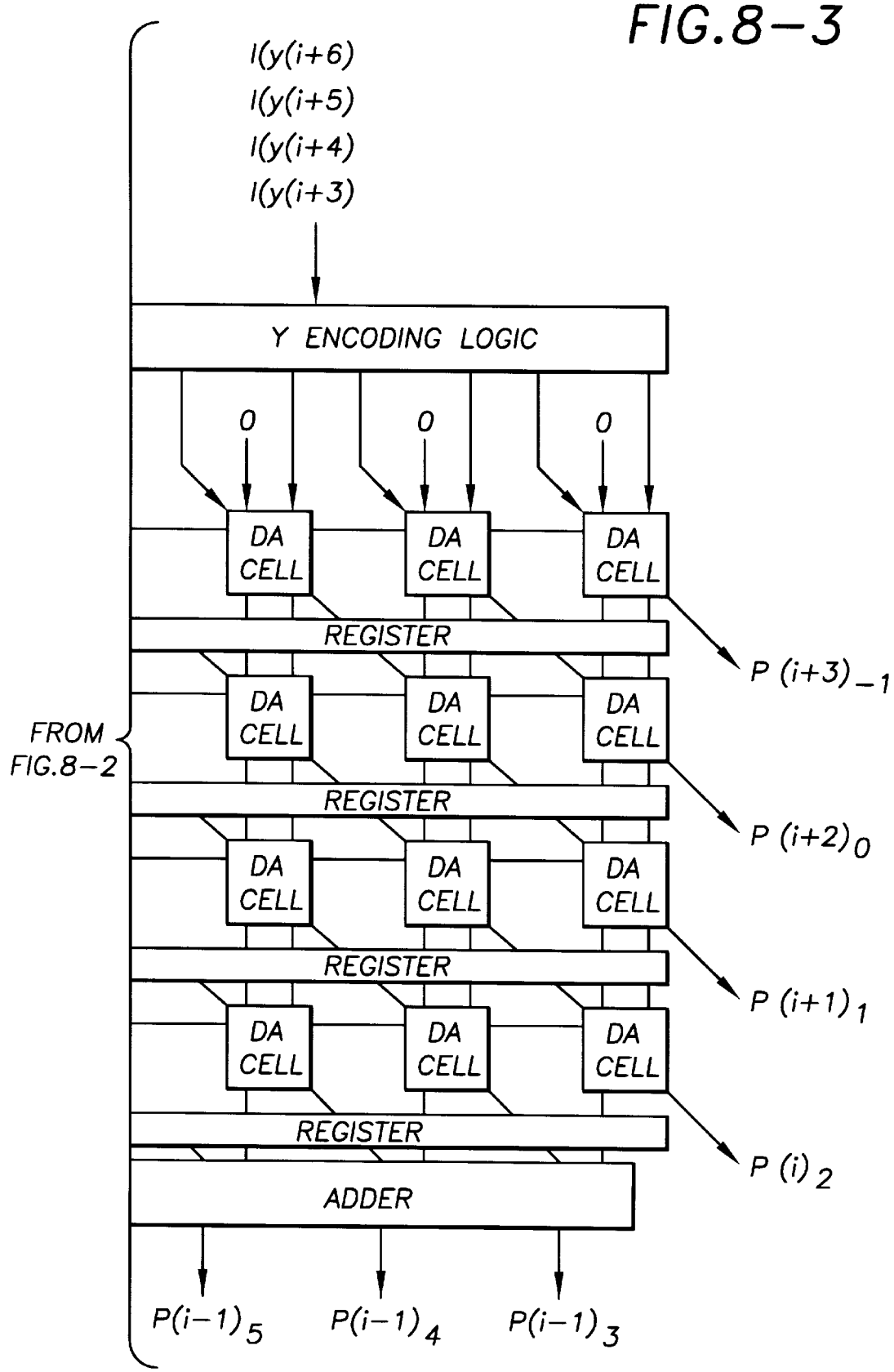

In FIG. 8, the value $R(x(i))_3$ denotes bit 3 of the real part of the ith sample of x. Since there is no ripple of results in the horizontal direction, the multiplier throughput is determined by the delay through one row of the multiplier, which is exactly the delay through a single DA multiplier cell. This pipelining need not be applied between each row of the multiplier; rather, pipelining registers could be inserted after every r rows, trading off increased throughput for silicon area and latency. Clearly, the insertion of pipelining latches into the flash multiplier array increases both the silicon area and latency associated with the multiply operation, but it offers a substantial increase in multiplier throughput as well. Further pipeling may be applied within a cell to achieve still greater throughput, at the expense of increased area and latency.

Of course, this pipelining of the multiplier will only improve butterfly 10 throughput if similar strategies are applied to other components of the butterfly. A logical candidate for such pipelining is a "ripple" adder 30 beneath the last row of the array. The throughput of that adder must be equal to the throughput of the multiplier array, or the increase in multiplier throughput will be meaningless.

Figures 1, 9:
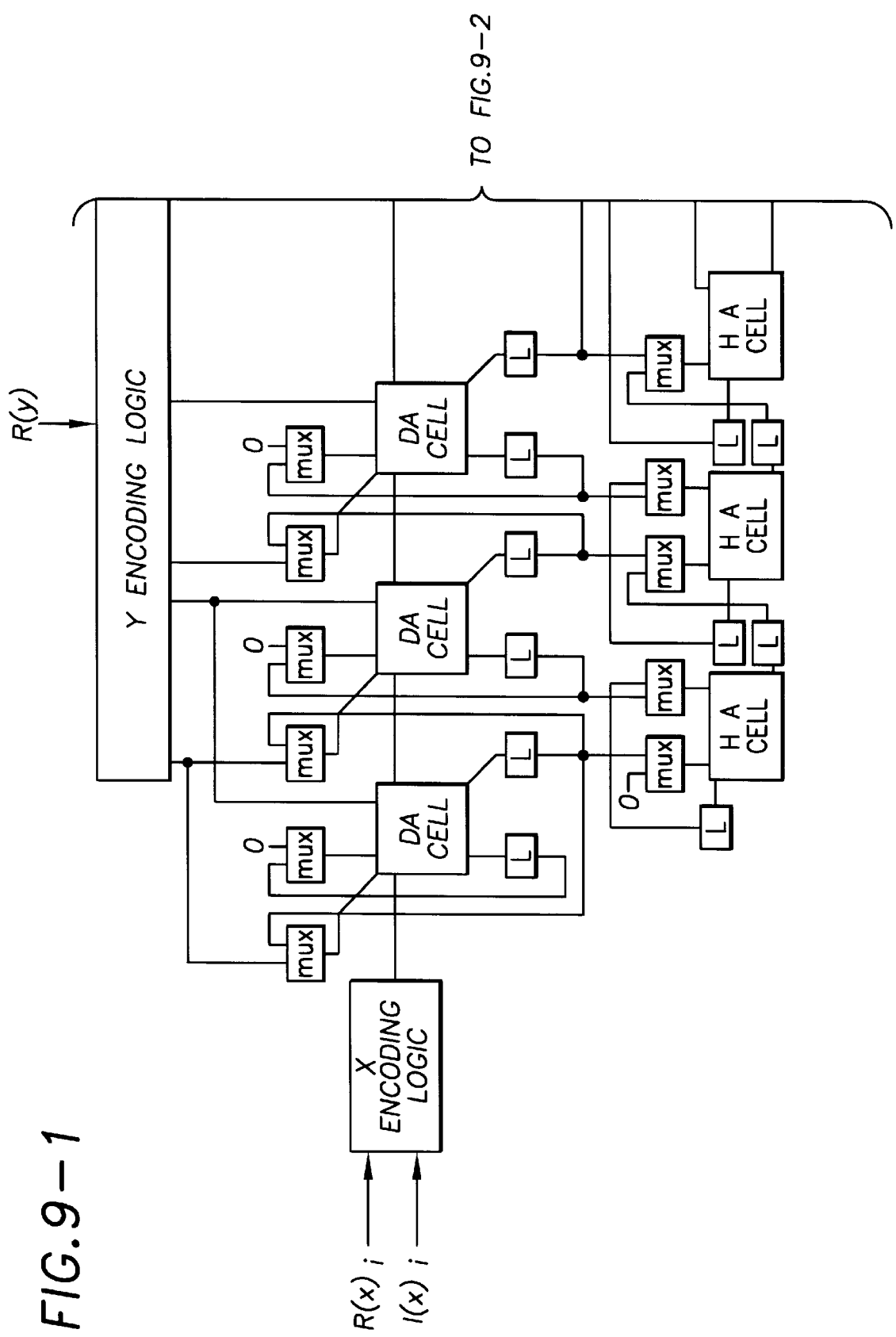
FIG. 9 is a block diagram of a bit-serial multiplier.
Figures 2, 9:
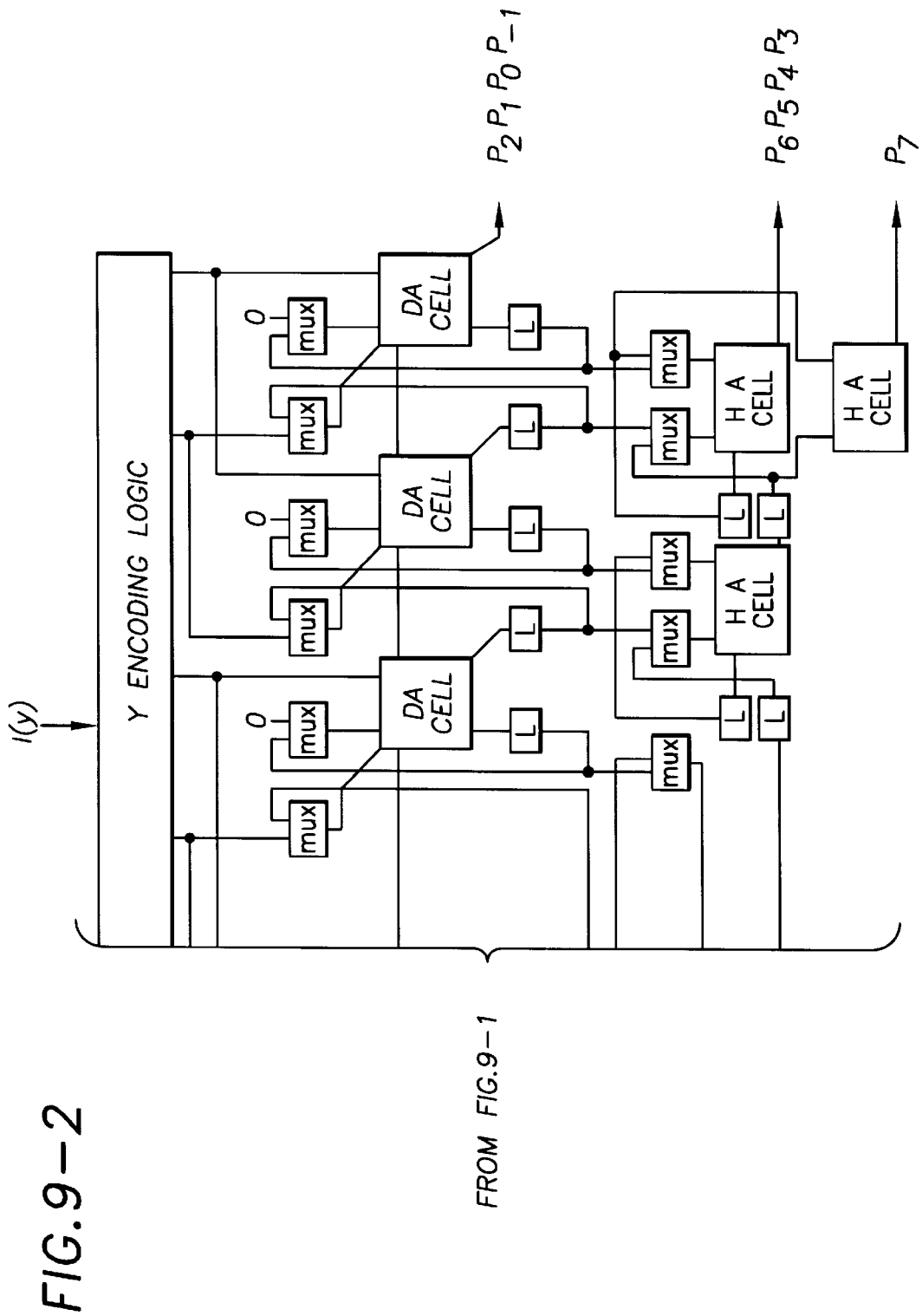

Iterative multiplication is very similar to the row-pipelined multiplier architecture discussed thus far. Instead of latching between rows of the array and distributing the x bits to all rows, we add latches after one or more rows and recirculate the results back into the same row or rows while operating on x in r-bit chunks. That is, rows of the array can be "folded" on top of one another so that the entire multiplication operation is calculated in r multiplier rows. The number of rows, r, is usually a factor of b, the number of bits in x. This concept is illustrated in FIG. 9 for b=4 and r=1, the bit-serial case.

Figure 10:
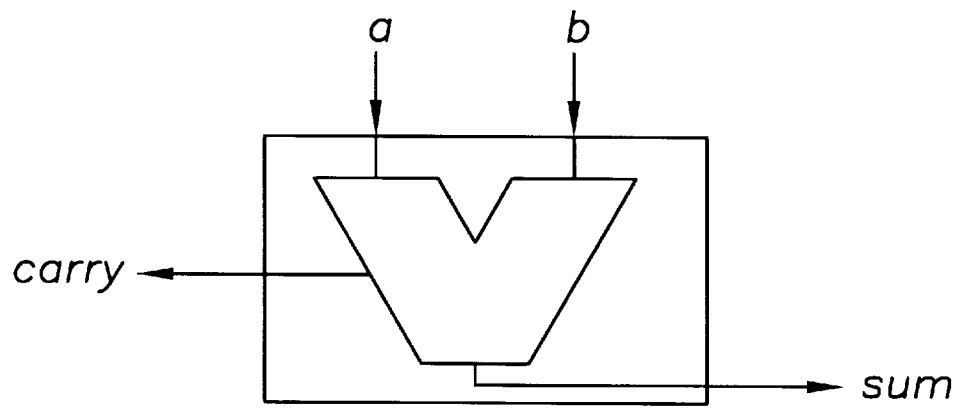
FIG. 10 is a schematic illustration of an half-adder cell.

The "ripple" adder 30 also computes bit-serially and is constructed from a row of half-adder cells with latches between cells. The latches are represented by the boxes labeled "L", and the contents of the half-adder (HA) cells are shown in FIG. 10. Notice that a mux is required at the input to the DA cells so that the accumulator may be cleared as the least-significant bit (LSB) of x enters the multiplier at the start of each multiplication. Similarly, a mux is used at the input of each HA cell to initialize the "ripple" adder for computation of the upper bits of the product. In order to maintain a multiplication throughput rate of T, a clock of frequency b×T is required. At each clock cycle, one bit (LSB first) of the product appears at the output of the right-most cell. After b cycles, the partial outputs of the multiplier row are loaded into the row of half-adder cells where the next b bits of the product are computed. Concurrently, the multiplier row computes the lower-order b bits of the next product.

Figures 1, 11:
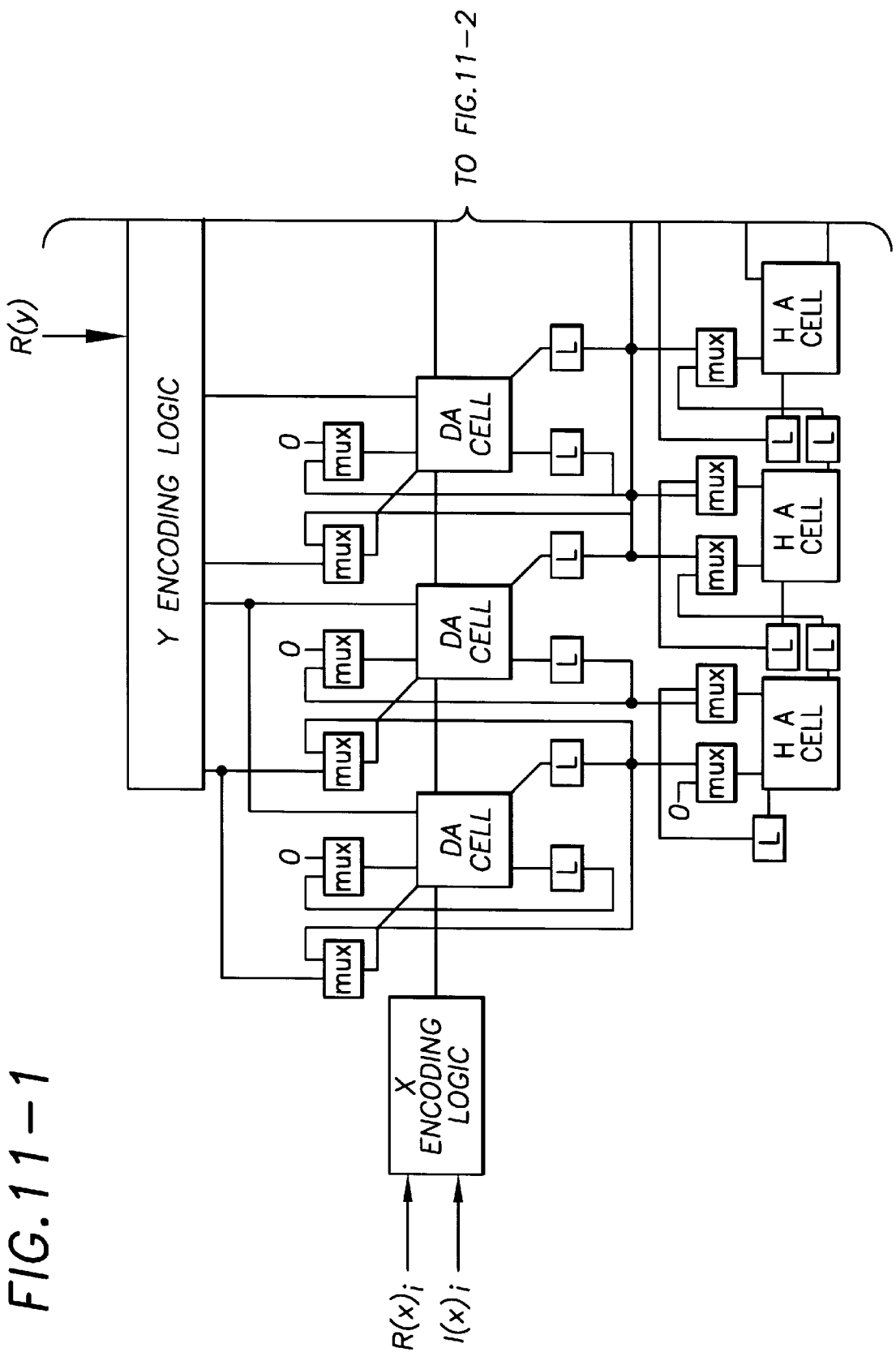
FIG. 11 is a block diagram of a modified bit-serial multiplier.
Figures 2, 11:
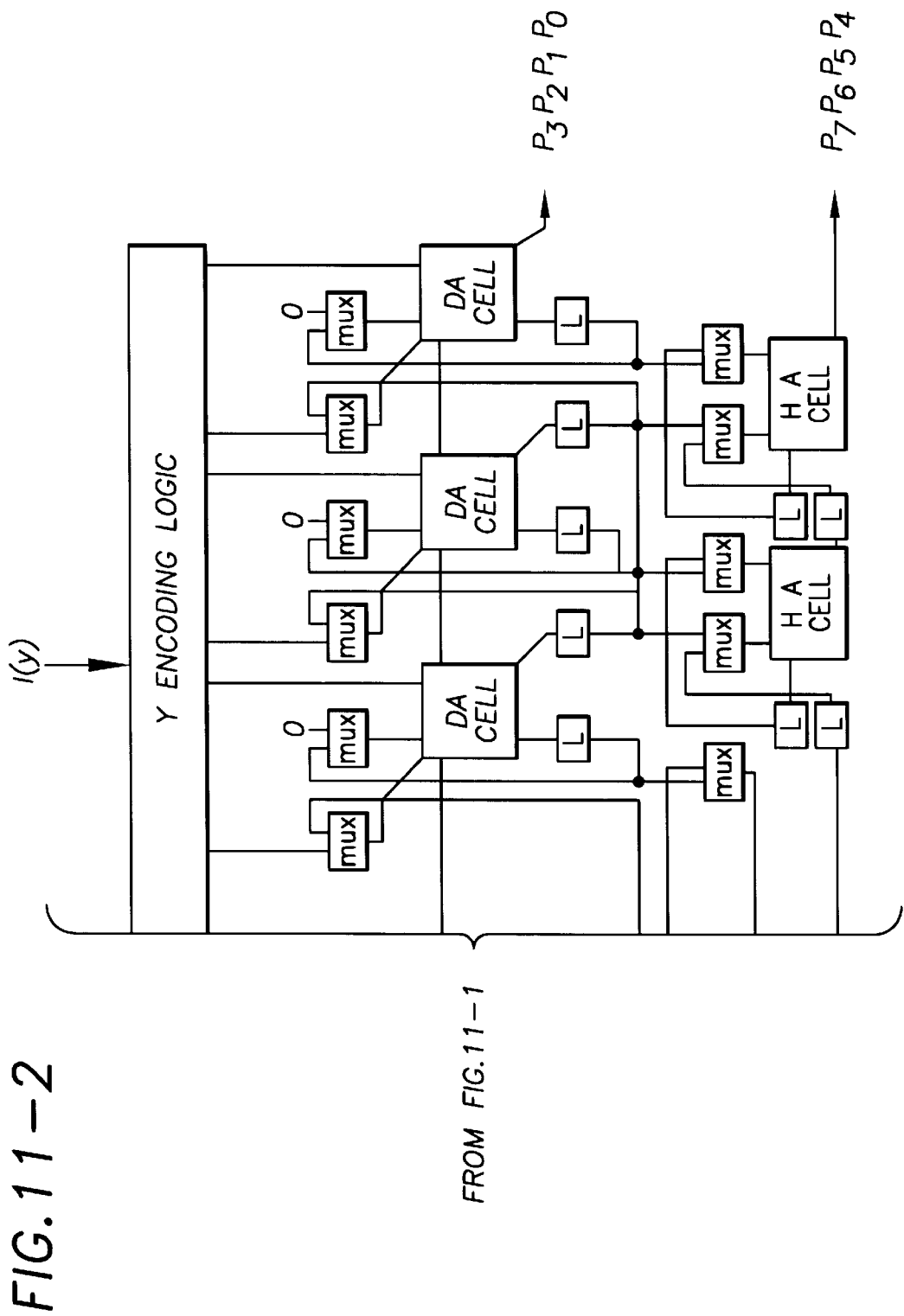

At this point, the most significant bit, $p_7$, remains to be computed, but in order to keep the pipe full, the multiplier and adder arrays must begin to compute with the next input set. An additional pipeline stage and an additional adder cell are required to complete the computation of the product p. Recall, however, that the two most significant bits (MSBs) are always identical and represent the sign of the product. The third computation stage is therefore not required. The modified bit-serial multiplier is shown in FIG. 11. Notice that we have changed the indices of the product bits to reflect the "shift left" that results from discarding the MSB.

Figure 13:
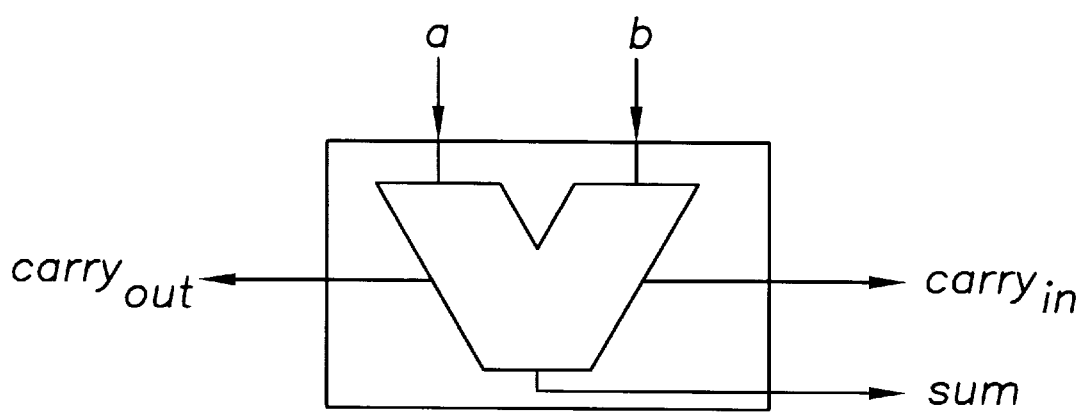
FIG. 13 is a schematic illustration of a full-adder cell.
Figures 1, 12:
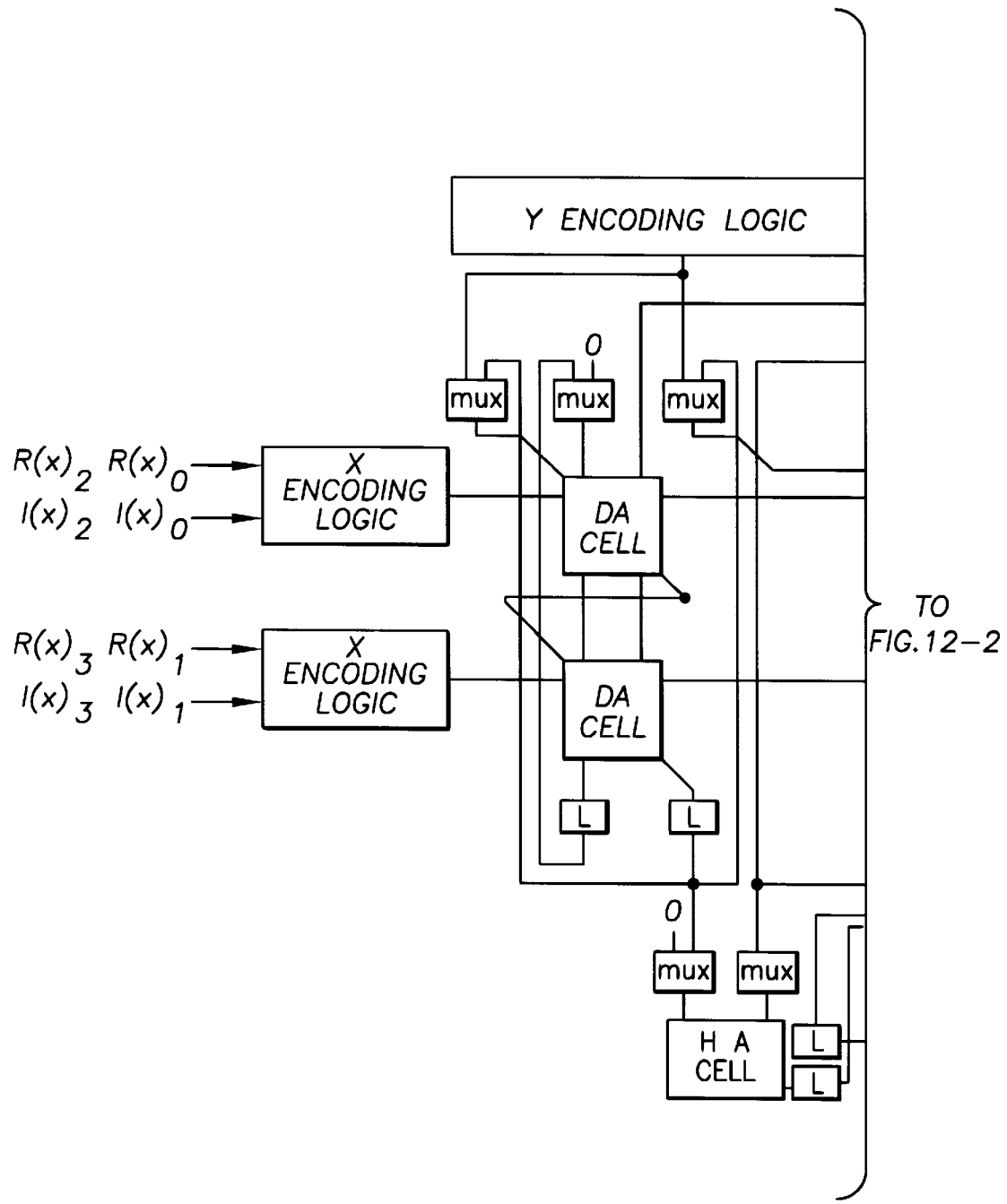
FIG. 12 is a block diagram of a complete digit-serial multiplier.
Figures 2, 12:
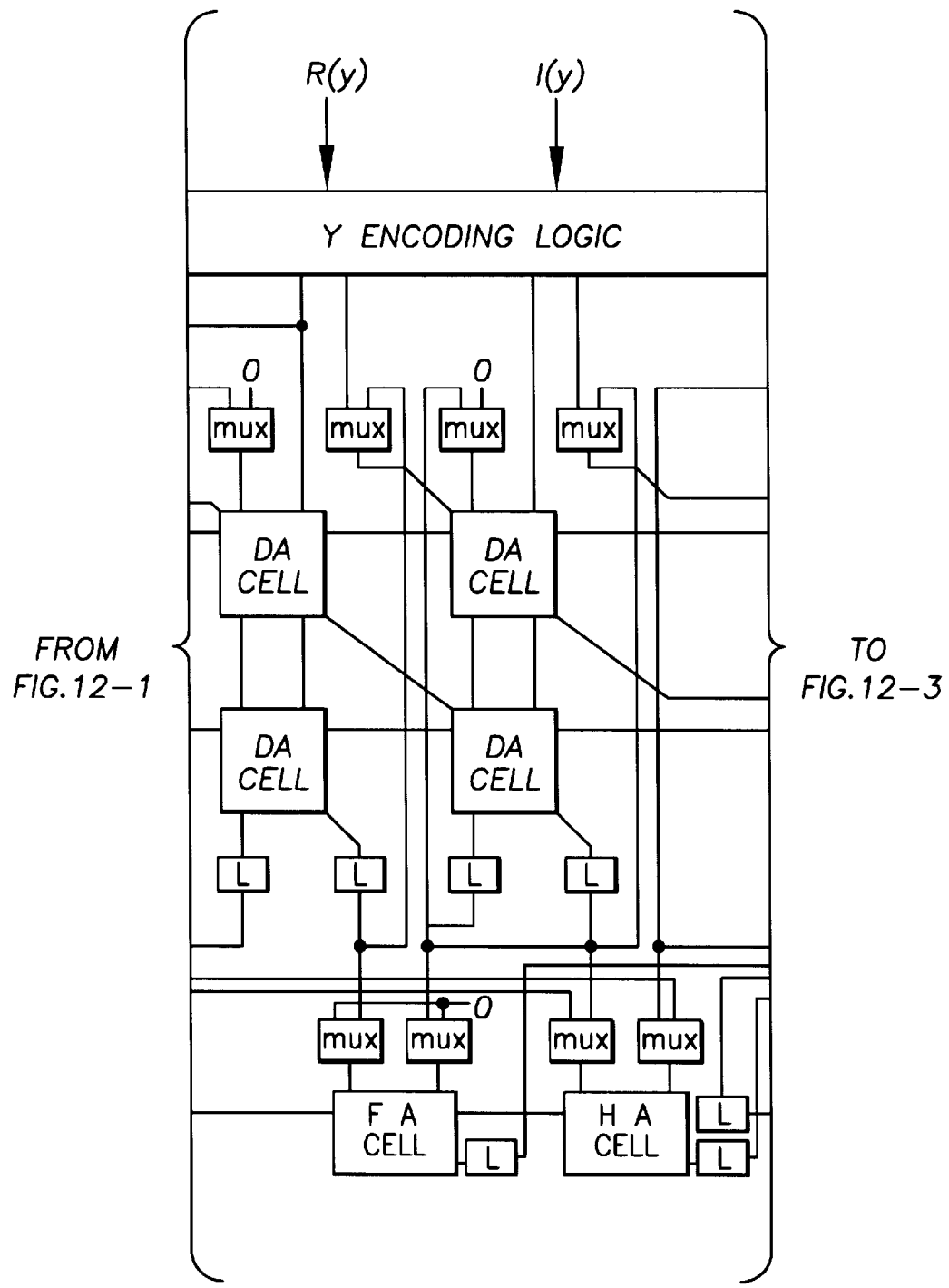
Figures 3, 12:
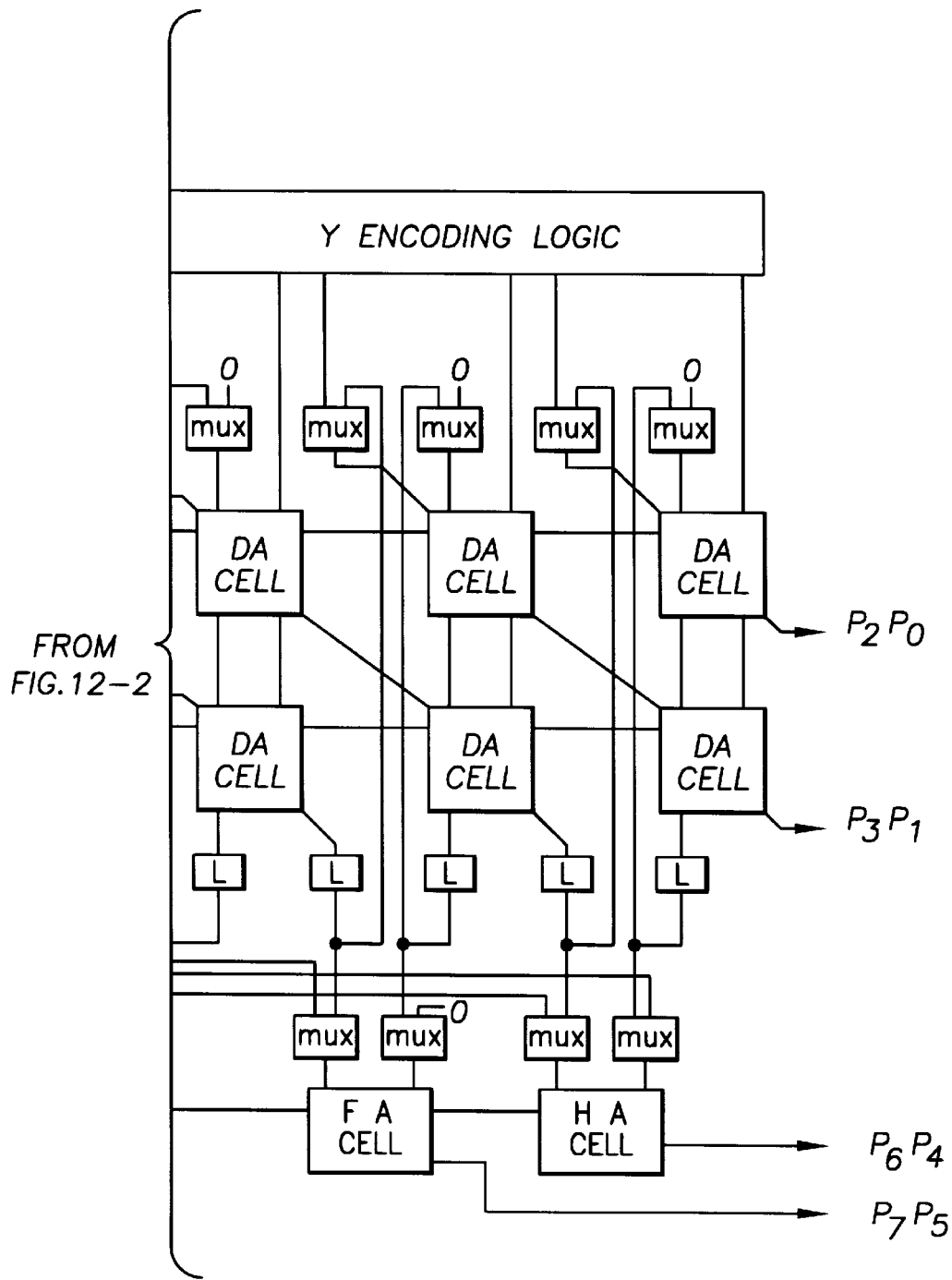

Of course, if this same folding procedure is applied to r rows, computations would be performed on r-bit digits (digit-serial multiplication) and the clock rate would become b/r×T. The complete digit-serial DA multiplier is shown in FIG. 12 for a 4-bit example with r=2. The "ripple" adder must also compute digit-serially and is now made up of half adders and fall adders (FAs). The FA cells are shown in FIG. 13.

The iterative multiplier, along with the digit-serial adders and substractors, enables the radix-4 butterfly 10 (FIG. 3) to be implemented in a mere 19,000 transistors. By comparison, a similar butterfly containing a flash multiplier and parallel adders would require approximately 120,000 transistors. This savings allows the addressing of higher-level system issues.

Figure 3A:
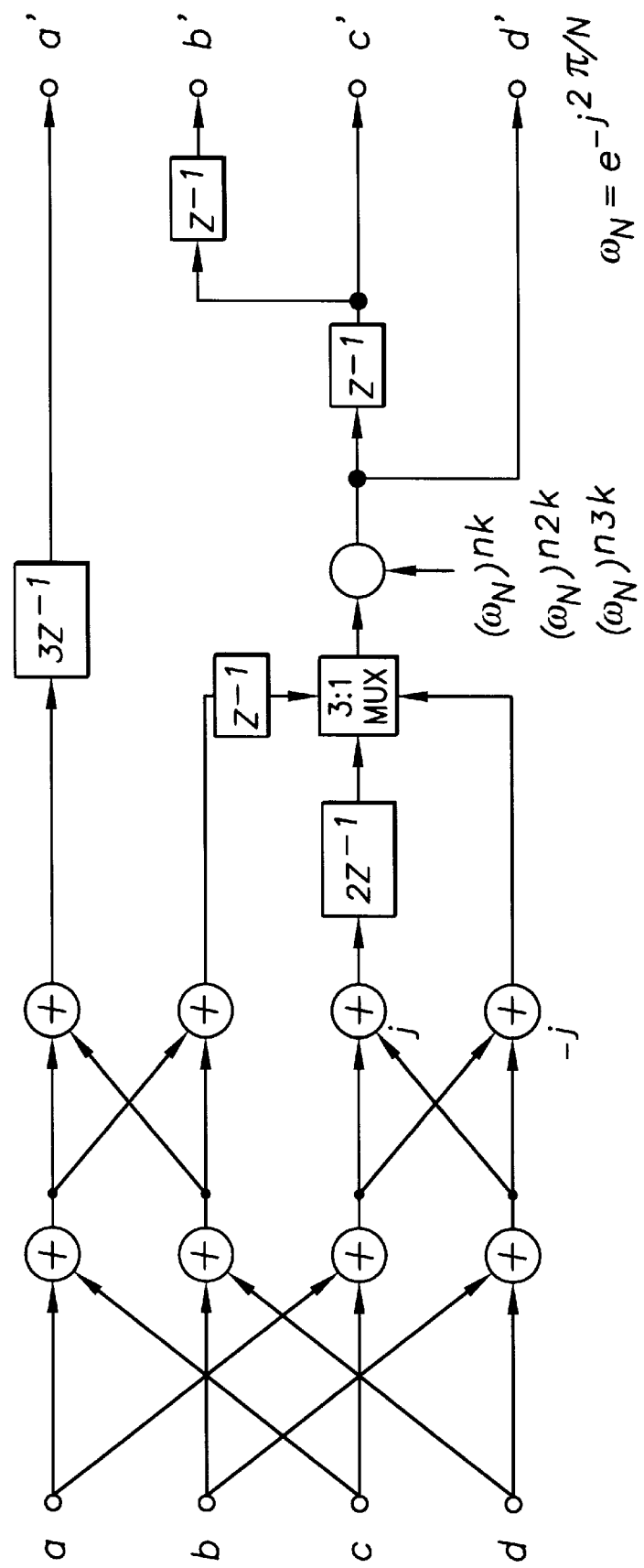
FIG. 3a is a block diagram of a multiplexed radix-4 FFT butterfly.

As data passes from stage to stage in an FFT, it grows in magnitude by two bits per stage. If the input dynamic range is not appropriately restricted, integer overflow may occur. To prevent this overflow, data may be scaled (divided by four) at some or all of the stages. This is done in the second bank of adders in the butterfly (FIG. 3a). In the first adder bank, the 32-bit inputs are added or subtracted to form results of up to 33 bits. These values are then combined producing up to 34-bit results. A static control input selects the scaling function at each stage. When scaling is enabled, the outputs of the second set of adders are shifted right by two bits and rounded. If we assume a binary point exists between bits 1 and 2 as a result of the division by four, then bits 0 and (the two least significant bits) are the fractional components of a scaled value. Our rounding circuit rounds up (adds one to bit 2, and discards bits 1 and 0) for fractional components greater than ½ ($11_2$), and rounds down (discard bits 1 and 0) for fractions less than ½ ($00_2$ and $01_2$). When the fraction is exactly ½ ($10_2$), the rounding circuit rounds either up or down based on a random decision. An on-chip linear feedback shift register generates eight pseudorandom bit sequences to control the rounding in the eight real adders for this case.

Traditionally, the FFT coefficients, or "twiddle factors," are stored in ROM and read by the FFT processor as needed. There are two primary disadvantages with this approach. First, it exacerbates the FFT's I/O bottleneck problem, and second, it increases the number of components required per stage. The latter is particularly objectionable when the FFT consists of several stages. On-chip coefficient storage is possible only for modest size or low-precision FFTs—the 32-bit complex coefficients for a 64K-point transform require 4 Mb of ROM, so on-chip storage is impractical. The solution according to the invention is to compute the coefficients on-chip.

Figure 14:
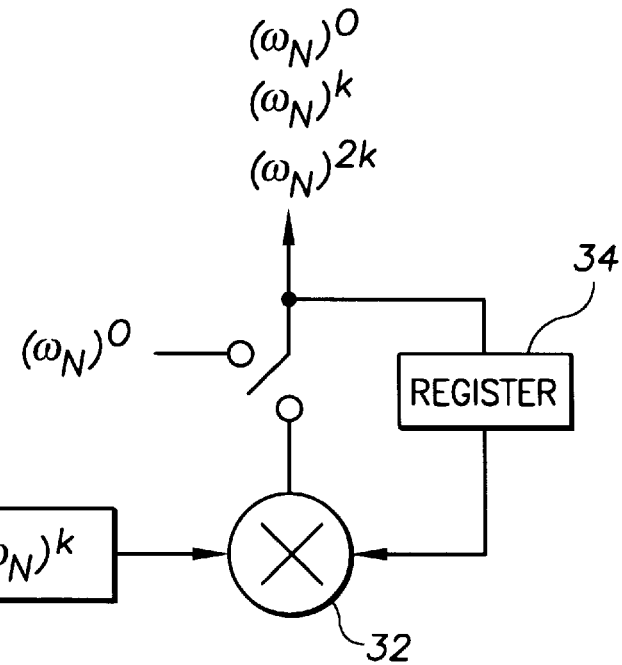
FIG. 14 is a block diagram of a recursive multiplier.

Each of the three coefficient sequences required by the radix-4 butterfly may be computed as the consecutive powers of a complex "seed" value. The sequences, and therefore the seeds, are determined by the stage number and FFT block size. If B is the block size processed at a particular stage of an N-point FFT, the three sequences are the B/4 roots of unity equally spaced from 0 to $-\pi/2$, $-\pi$, and $-3\pi/2$ respectively. For an inverse FFT, the conjugates of the same three sequences are used. A method of generating these coefficient sequences is a recursive multiplier 32 and storage register 34, as shown in FIG. 14. This implementation calculates the sequence $(\omega_N)^0, (\omega_N)^k, (\omega_N)^{2k}, \ldots, (\omega_N)^{(B/4-1)k}$, where $\omega_N = e^{-j2\pi/N}$ for a forward FFT and $\omega_N = e^{j2\pi/N}$ for an inverse FFT. The generator is initialized with the coefficient $(\omega_N)^0 = 1+j0$ at the beginning of a block. The output is fed back to one of the multiplier inputs, where it is multiplied by the contents of the seed register, $(\omega_N)^k$. The product, which is the next coefficient, is fed back into the recursive multiplier 32. This procedure is repeated until the entire sequence is computed. At that time, the coefficient generator is reinitialized and the sequence is repeated.

Figure 15:
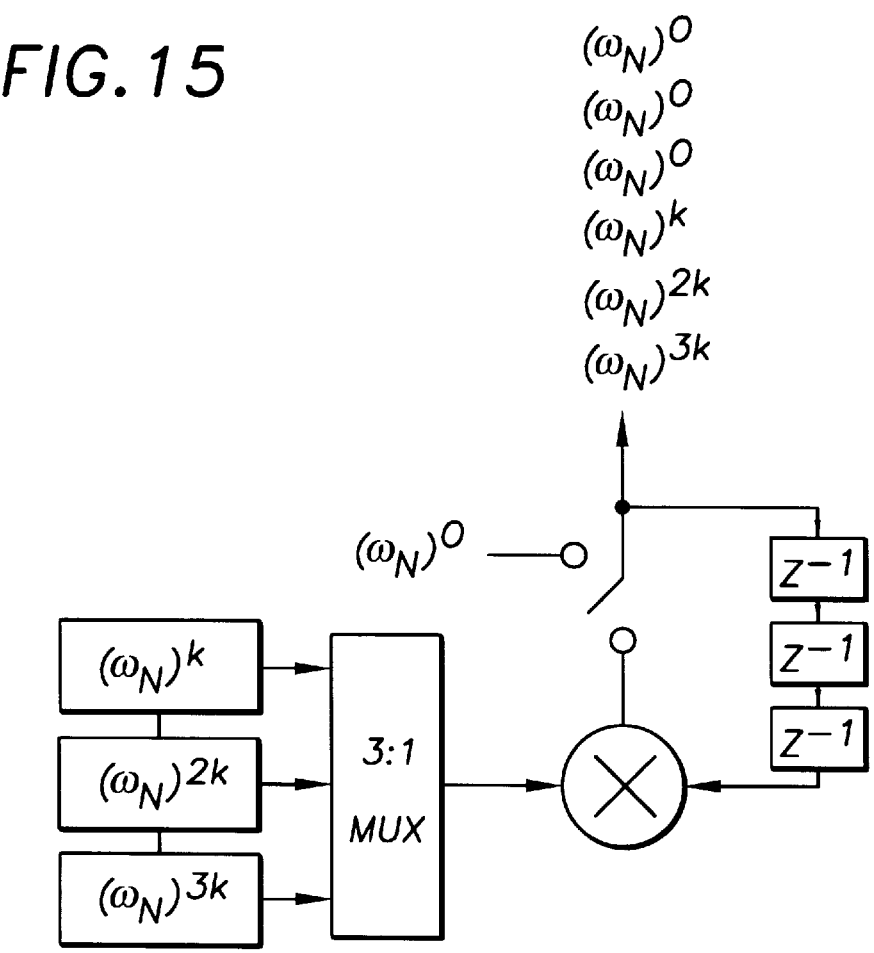
FIG. 15 is a block diagram of a coefficient generator.

To generate the three sequences for the radix-4 butterfly, three generators of the kind shown in FIG. 14 are required, each with a different value for its seed: $(\omega_N)^k, (\omega_N)^{2k}, (\omega_N)^{3k}$. An alternative implementation employs the same time multiplexing scheme used in the butterfly. Rather than three individual coefficient generators, a single generator is used to compute the interleaved coefficient sequences. Again, the single multiplier must now be clocked three times faster than in the three-multiplier implementation. The three registers containing the seeds also must be multiplexed at the input to the multiplier, as shown in FIG. 15.

The generated coefficients will contain errors due to both the initial quantization of the seed value and the round-off error in the multiplier. The dominant error source is the seed quantization. Since the seed is involved in the computation of each coefficient in the sequence, its error contribution grows linearly with each multiplication. If the quantization error magnitude is represented by $\epsilon$, then $|(\omega_N)^k|=1+\epsilon$, and the magnitude of the coefficient generated on the qth recursive multiplication is $$|(\omega_N)^{nk}|=(1+\epsilon)^n \approx 1+n\epsilon.$$

Figures 17, 18:
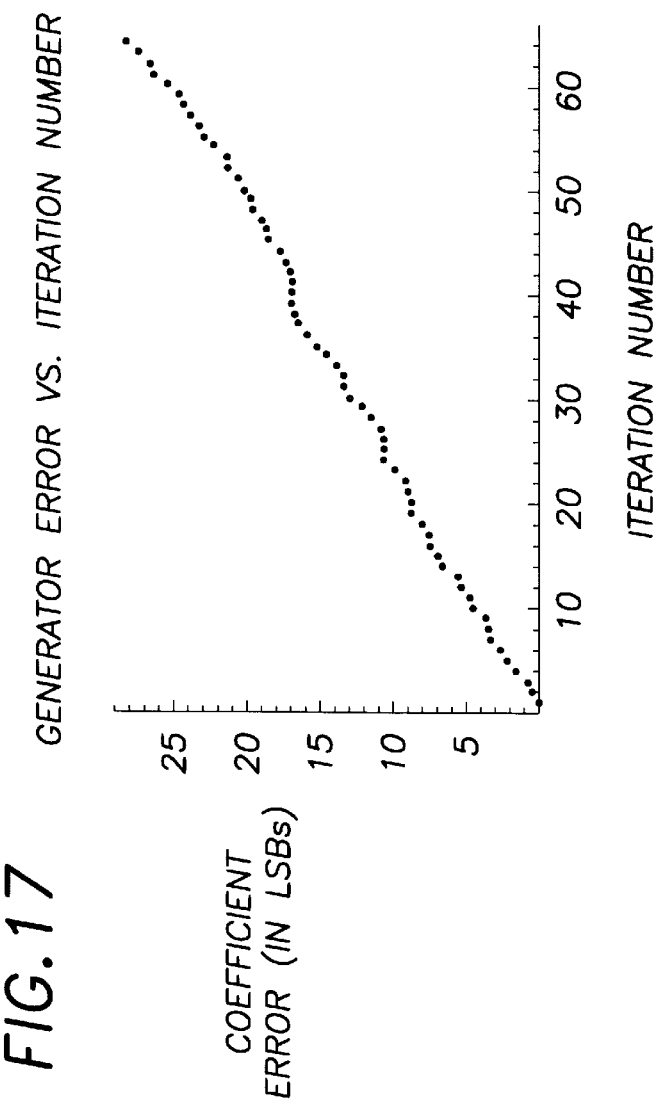
FIG. 17 is a graph of coefficient error versus iteration number.
FIG. 18 is a diagram illustrating address generator modes.

Experimental results agree with this simple model; the actual growth in the calculated error vector is shown in FIG. 17 for the first 64 terms of one coefficient series. To minimize the impact of this error term, the heart of the coefficient generator 18 is a 42-bit complex multiplier that is architecturally similar to that in the butterfly 10, but with three-bit digits. The 42-bit complex results are rounded to 32 bits before being used in the butterfly 10. The 42-bit precision of the multiplier represents a compromise between multiplier complexity and error magnitude. It is noted that when more than 2K multiplier iterations are needed, the low-order bits of coefficients in some stages may be corrupted by noise. Since, for the radix-4 processor, I=N/4, this can occur only for block lengths of 16K points or longer. Experiments indicate that this is not problematical.

An additional constraint with regard to the seed is that we must ensure that all quantized seeds reside within the unit circle. Since the coefficients are scaled so that the maximum positive two's-complement integer, $7FFFFFFF_{16}$, represents the quantity one, our representation does not accommodate real or imaginary components greater than one. If the magnitude of the initial coefficient seed is greater than one, it will continue to increase as we generate our coefficient sequence. This will cause integer overflow at or near coefficients such as $\pi/2$ or $\pi$, where all of the energy is concentrated in the imaginary or real components, respectively. This is illustrated as follows: if we represent a quantized coefficient seed as $(\omega_N)^k=a+jb$, then $|\omega_N|=\sqrt{a^2+b^2}$. If $|\omega_N|<1$, then $|a|<1$ and $|b|<1$ for all values of a and b. We showed previously that $|\omega_N|^k=(1+\epsilon)^k$. Clearly, $$|1+\epsilon|^k<-1 \Leftrightarrow \epsilon<0.$$

Figure 16:
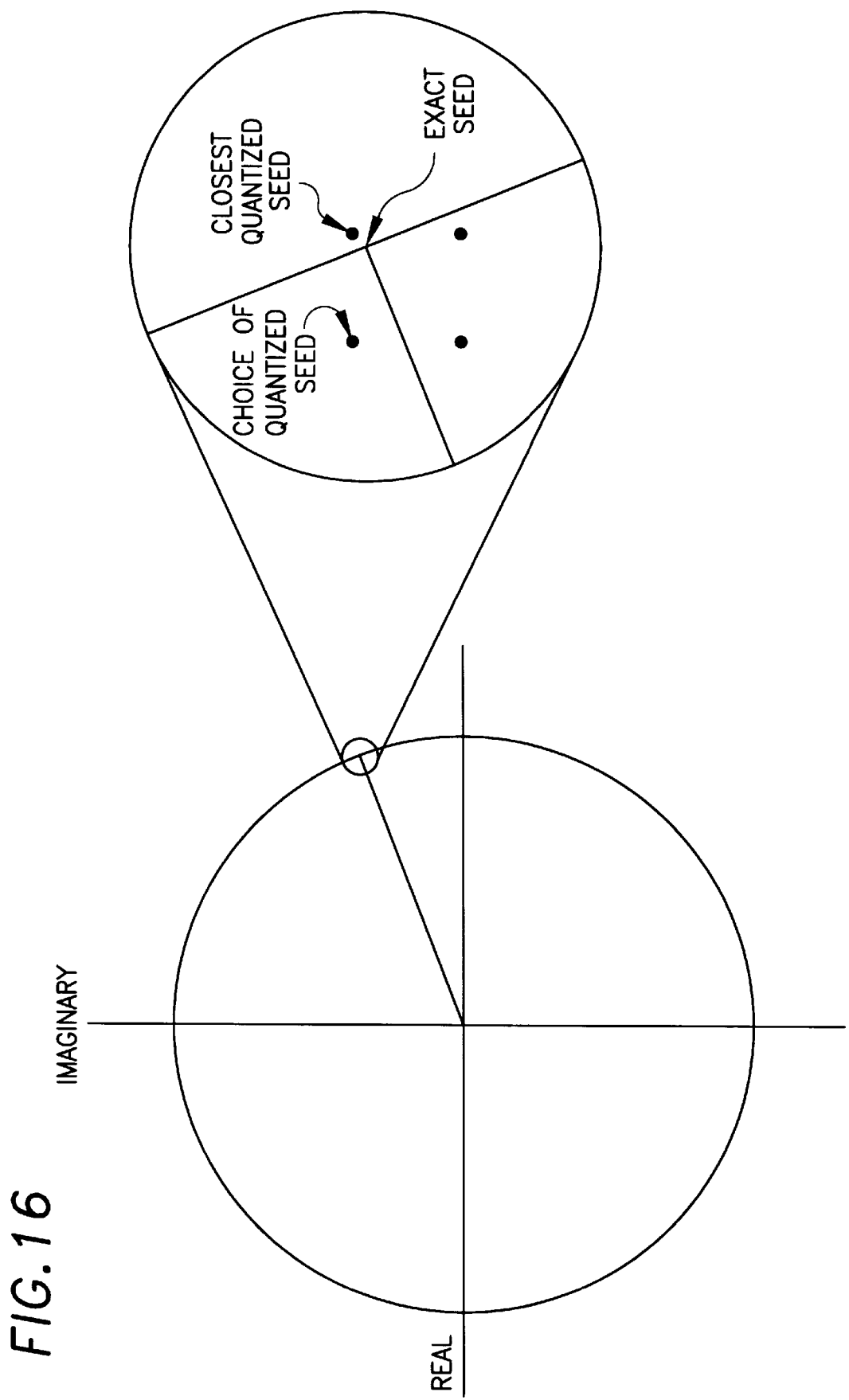
FIG. 16 is a diagram illustrating coefficient seed quantization.

To prevent overflow, we choose the nearest seed quantization value within the unit circle. FIG. 16 shows an example of a complex seed computed to infinite precision and plotted on the unit circle along with its four nearest quantization values. The example clearly shows that the nearest quantization of the seed lies outside of the unit circle. For this case, we choose the value indicated. The use of the 42-bit multiplier and careful selection of the seeds allows us to generate coefficients that are accurate to 32 bits for most stages. In Table 1, the accuracies of the last generated coefficient (the worst case) for all stages of a 64K-point FFT are given.

TABLE 1

Coefficient Accuracy

| Stage | Block Size | # Recursive Multiplies | Accuracy in Bits |
|---|---|---|---|
| 0 | 4 | 0 | 32 |
| 1 | 16 | 4 | 32 |
| 2 | 64 | 16 | 32 |
| 3 | 256 | 64 | 32 |
| 4 | 1K | 256 | 32 |
| 5 | 4K | 1K | 32 |
| 6 | 16K | 4K | 31 |
| 7 | 64K | 16K | 29 |

The seed values for all stages of a forward and inverse transform are stored in on-chip read-only memories (ROMs). This eliminates the need for external storage and control components. The appropriate seeds for each stage are selected at power-up and loaded into the active registers of the coefficient generator. Three seeds are required for each stage of a forward or inverse FFT. The 42-bit complex seeds for a forward FFT are converted to a 43-bit K and K' format and stored in three 8-word by 86-bit ROMs. A single ROM contains the $(\omega_N)^k$ seeds for all eight stages. Likewise, the remaining two ROMs contain the eight $(\omega_N)^{2k}$ and $(\omega_N)^{3k}$ coefficient seeds. For an inverse FFT the same seeds are used, but the K and K' values are exchanged. Three control inputs to the butterfly processor that indicate the stage number are used to select the addresses of the ROMs, and a single control input indicating forward or inverse FFT operation selects K and K' from the ROM output. The stage inputs are also used to compute the block length of the data at that stage and, therefore, the rate of the restart signal to the coefficient generator. This allows a single coefficient generator design to compute the coefficients for any stage of a forward or inverse FFT for up to a 64K-point transform.

The inclusion of an on-chip coefficient generator with the butterfly component eliminates the need for coefficient ROMs, ROM address counters, and other support components. This results in a dramatic reduction in overall system chip count and area.

Another integral part of an FFT is the permutation of data between processing stages. In traditional "single-chip" processors, this permutation is accomplished by combining results-in-place FFT algorithms with a double buffering scheme. In a unidirectional pipeline such as the pipeline of this invention, data shuffling could be accomplished by double-buffering between each FFT stage, but results-in-place computation is not possible. However, a double-buffering approach would increase the processor's memory requirements; we regard this as unacceptable. An alternative is to shuffle, or permute, the data "on-the-fly," an option available only in the pipeline processor disclosed herein. The shuffling sequence required in the decimation-in-frequency (DIF) algorithm is amenable to such an approach.

Our FFT architecture requires only a single memory component at each stage to facilitate the required data shuffling. An address generator is contained on the FFT butterfly processor IC, therefore eliminating the need for off-chip address counters. Data passes into and out of the memory continuously according to a read-modify-write accessing scheme. On each data cycle, an address is produced by the butterfly chip at each stage for its preceding memory. During the first half-cycle, the data sample in the selected memory location is read into the butterfly for processing. In the second half-cycle, an output data sample from the previous stage is written into the memory at the newly evacuated location. The data is shuffled through the generation of permuted addresses. This simple data-flow structure places all of the shuffling complexity in the address generation hardware.

In the approach of the invention, data is written into the buffer memory by a sequence of addresses, A. It can then be read in a permuted order, ρ (A), as required by the FFT algorithm. Note that the initial ordering, A, is insignificant so long as ρ (A) can be generated. It is possible, therefore, to operate the interstage buffers efficiently by using read-modify-write memory access cycles. As the first block's data is read in order ρ (A), the next block's data is written in that order. That block is then read by a new permutation of addresses, ρ (ρ(A)), while the third block is simultaneously written in that order. The cycle length of the permutation is given by the smallest integer c for which the equality $$\rho^c(A) = A$$

holds. The cycle length is an indication of the relative complexity of the address generator. For the simple case of bit reversal, c=2. In the 64K-point radix-4 FFT some stages have a c as large as eight.

The address generator operates in any one of three modes, selected by two input control signals to the butterfly chip. There are three different address permutation algorithms required, depending on the chip's position in the FFT path and the format of the input data. Our address generator design supports all three.

The first stage of the FFT accepts data in either natural or digit-reversed order. Since the forward FFT produces frequency samples in digit-reverse order, it may be possible to process these samples without reordering them. In this case, the processed frequency-domain data may be passed directly to the inverse FFT with no adjustment required. These two cases—first stage/natural order, and first stage/digit-reversed order—define two of the address generator modes. The third mode is used for all other stages (i.e., all stages with the exception of the first).

Generating these address permutations is the primary function of the memory controller 20 (see FIG. 3). Additionally, the controller 20 provides the signal timing required to read the 256 bits (four 64-bit quantities) over a 32-bit input data bus. Of course, this includes the generation of write enable and output enable signals for the memories.

By including a sophisticated address generator in the design of the radix-4 FFT butterfly processor, we have greatly simplified the overall FFT system design. The data shuffling between FFT stages is implemented with no external control components; only a single RAM component is required.

The FFT butterfly 10 processor IC is pin-programmable for use in any stage in a forward or inverse transform. There are several control pins for accomplishing this programmability, as described below. Each is a static control signal that must be established at initialization.

STAGE [2-0]: This three-bit vector indicates the stage number in the cascaded FFT architecture. In an N-point transform, stages are numbered from $\log_4$ N−1 to 0, where stage 0 is the last stage in the data path. The stage value controls the address generator and the restart operation of the coefficient generator.

SCALE: If SCALE=1, data in the butterfly is divided by four. This is done at the adder/subtracter components. A pseudorandom bit is used to ensure unbiased rounding.

FOR_INV: If FOR_INV=0, the chip computes the butterfly for a forward FFT. If FOR_INV=1, the inverse FFT is computed.

M[0-1]: This two-bit vector specifies the mode of the address generator. FIG. 18 shows the three possible modes.

The FFT processor chip uses a two-phase nonoverlapping clocking scheme. The two system clocks, $PHI_1$ and $PHI_2$, are input signals to the chip. These clocks should have a frequency of 12×R, where R is the overall complex data throughput rate. All clocked inputs to the chip are latched on-chip on $PHI_1$ and should therefore be stable during the entire "high-time" of $PHI_1$. For optimal performance, all inputs to the chip should change on or near the rising edge of $PHI_2$. All outputs from the chip change following the rising edge of $PHI_2$ and will be stable during $PHI_1$.

The pin description of the radix-4 FFT butterfly processor chip implementation is shown in FIG. 19.

Figure 20:
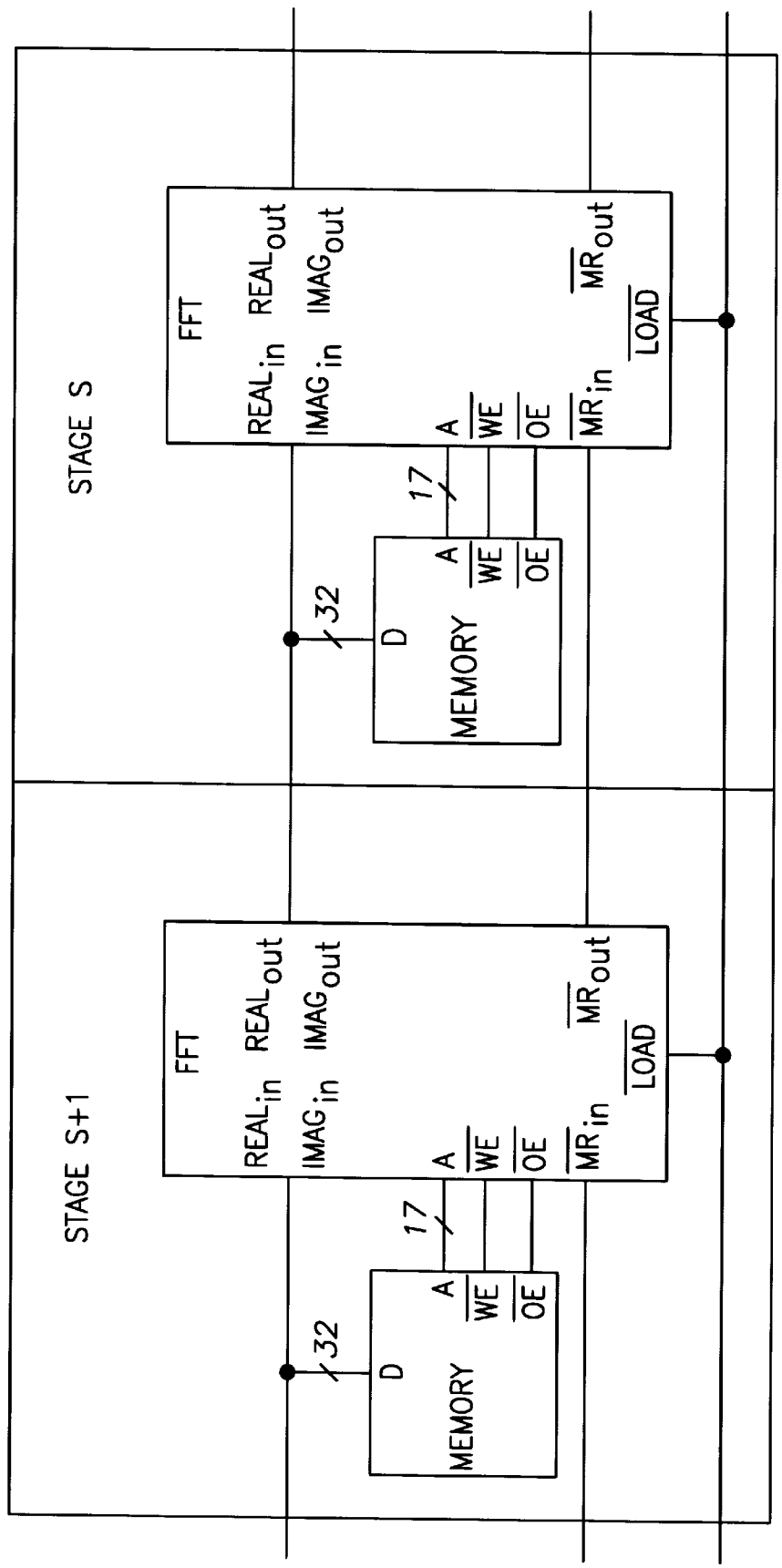
FIG. 20 is a block diagram showing cascaded chip interface.

The FFT of large data blocks—up to 64K-points—may be performed by cascading stages of the FFT butterfly processor and memory chips. For an N-point FFT, $\log_4$N stages are required. The FFT and memory chips are interconnected as shown in FIG. 20. The $REAL_{out}$ and $IMAG_{out}$ data ports from the butterfly of stage s+1 and the $REAL_{in}$ and $IMAG_{in}$ data ports from the butterfly stage s should be connected to the data (D) port of the static RAM at stage s, and the address (A) port from stage s should be connected to the address port of the RAM at that stage.

At power up, the coefficient seeds must be loaded into the coefficient generator at each stage. A negative pulse of one cycle in duration on the $\overline{LOAD}$ input of the butterfly processor chips is required. The signal should transition at or near the rising edge of $PHI_2$. The load operation begins concurrently with the negative-going edge of $\overline{LOAD}$, and continues for 45 clock cycles. During this time, all processing in the FFT chip is disrupted.

Figure 21:
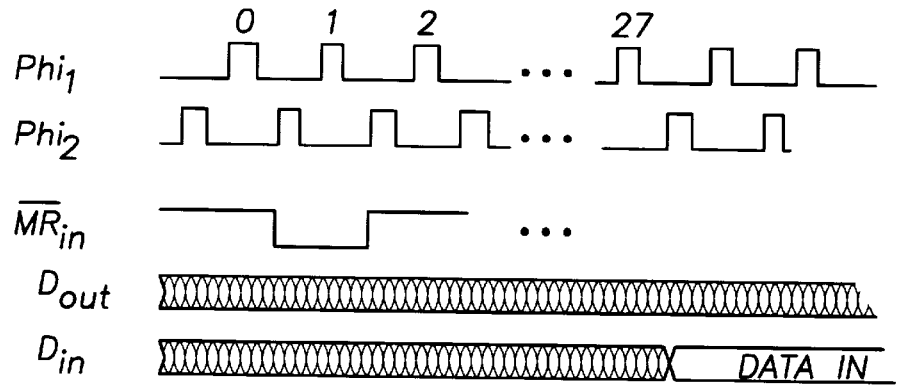
FIG. 21 is a diagram showing input/output data timing.

To provide for the proper timing of the FFT chips, each must receive a reset signal. This signal restarts the address generator and coefficient generator and synchronizes all of the internal operations. In a cascaded FFT implementation, each FFT chip must be reset at a different time to account for the latency through each chip. Rather than requiring multiple resets (one for each chip), we have included the logic on each FFT chip to generate the reset signal for the next stage from its own reset signal. Each chip has an $\overline{MR}_{in}$ and an $\overline{MR}_{out}$ pin. The $\overline{MR}_{out}$ signal from stage s must be connected to the $\overline{MR}_{in}$ signal for stage s−1, and only one reset signal (into the left-most FFT chip) is required to synchronize the entire array. Data may be written into the memory preceding the first stage of the FFT, starting 27 cycles after the leading (negative-going) edge of the reset signal. This initial latency accounts for the time required to synchronize the weight generator and coincides with the write cycle at the first valid address from the address generator. This timing is depicted in FIG. 21.

Figure 22:
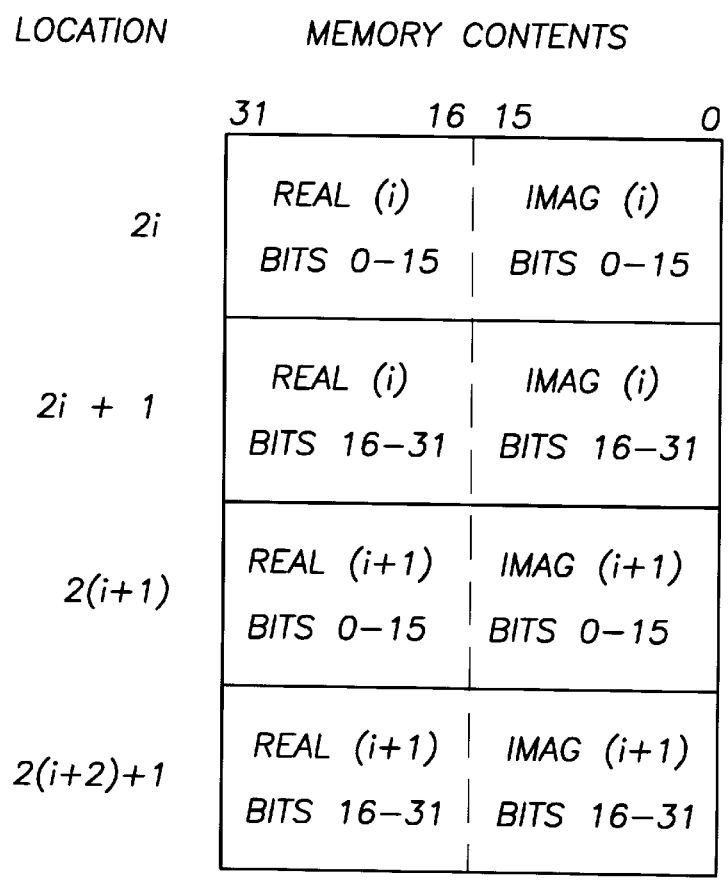
FIG. 22 is a diagram of the data input/output format.

To reduce the number of input/output (I/O) pins required for the butterfly processor, we have adopted a 32-bit, word-serial data format. Each 64-bit complex datum is divided into two consecutive words and transferred to and from the memories as shown in FIG. 22. Both the input and output registers follow this I/O format, so no conversion is required between stages of the FFT. For a block size of B words processed at a stage, a memory of size 2B by 32 bits is required.

At each stage, the memory introduces a latency, since it must first be written into before data is read out in a shuffled order to the FFT chips. For the first stage, all N data words must be stored and this requires 12×N system clock cycles. The second stage also requires N words of memory, and its memory also introduces a latency of 12×N. At each succeeding stage, the memory requirement—and therefore the memory latency—reduces by a factor of four. The FFT chips at each stage also introduce a fixed latency of 90 system clock cycles. The overall FFT latency, $\tau_{total}$, in system clock cycles for an N-point transform is expressed as $$\tau_{total} = 90 \log_4 N + 12N + 12 \sum_{l=0}^{\log_4 N - 2} \frac{N}{4^l}$$

The final FFT output will be in digit-reversed order and may therefore have to be restored to natural order. Remember that the FFT chips allow digit-reversed inputs at the first stage. In an application where some type of frequency-domain signal processing is performed between a forward and inverse FFT and the outputs of the forward FFT can be processed in digit-reversed order, they may be fed directly into an inverse transform after processing, without the need for any reordering. However, this would still leave the outputs of the inverse FFT in digit-reversed order.

Figure 23:
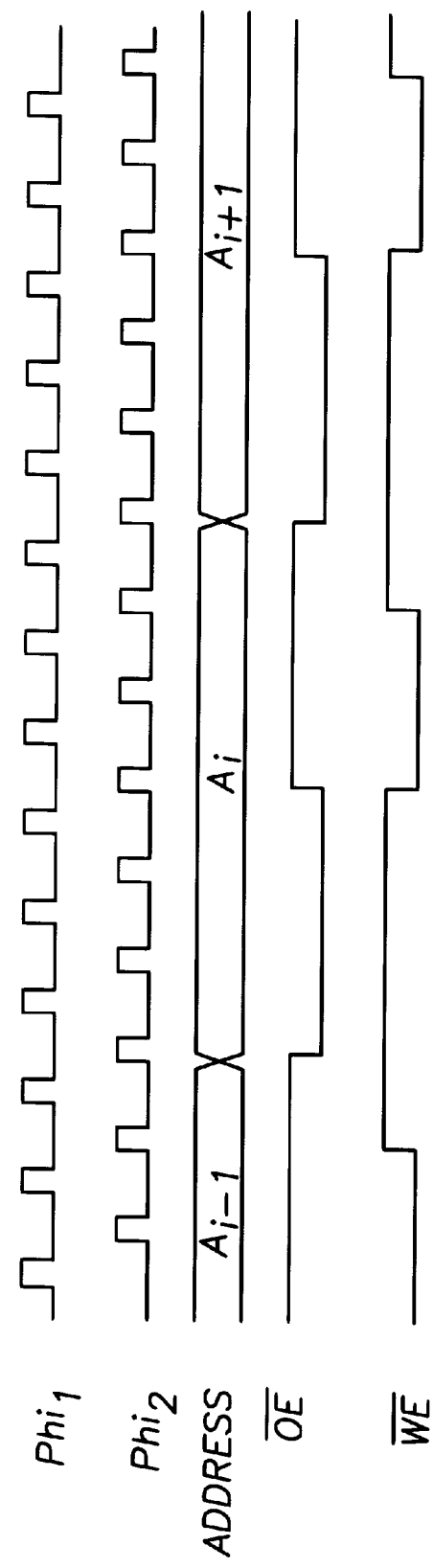
FIG. 23 is a timing diagram showing memory interface timing.

The FFT butterfly processor outputs two signals that can be used to control the external memory module interface. The output signal, $\overline{OE}$, is synchronous with the on-chip system clocks and indicates when the FFT chip is reading data ($\overline{OE}$=0) from the memory preceding it or writing data ($\overline{OE}$=1) to the memory following it in the data path. This signal may be connected directly to the $\overline{OE}$ input of the memory, as shown in FIG. 20. Many memory components do not require an $\overline{OE}$ signal. In cases where $\overline{OE}$ is not used, that output from the FFT chip may be left unconnected. The other memory control signal generated by the FFT butterfly processor is $\overline{WE}$. This signal controls the write operation to the memory. The timing of the memory interface is shown in FIG. 23.

The fundamental architecture of the invention is applicable to FFTs of arbitrary precision, throughput and block size. The complete radix-4 processor constructed in accordance with the invention, including all ancillary support functions, requires fewer than 63,000 transistors and fits on a small 6.5×5.2 mm die when implemented in 1.2 μm CMOS. Although throughput rates are moderate, butterfly I/O pin requirements have been minimized through the use of digit-serial techniques. This implementation of the processor is packaged in a 132-pin leadless chip carrier. This implementation is suitable for a wide variety of applications that require processing data at moderate throughput rates with a minimum of a available system area and power.

What is claimed is:

1. Fast fourier transform processor comprising a plurality of pipelined, functionally identical stages, each stage including only a single memory component and including means for providing coefficient and programmable memory address generation support functions necessary to perform a portion of a fast fourier transform operation on a block of data, the output of the processor being the fast fourier transform of the data block.

2. The processor of claim 1 wherein each stage includes a computational butterfly.

3. The processor of claim 2 wherein the computational butterfly is fully programmable.

4. The processor of claim 2 wherein the computational butterfly employs iterative multiplication.

5. The processor of claim 1 wherein the support function includes coefficient generation by recursive multiplication of the consecutive powers of a complex seed value.

6. The processor of claim 1 including $\log_6 N$ stages where r is the radix order and N is the number of samples.

7. The processor of claim 1 wherein each stage includes a buffer memory interface.

8. The processor of claim 7 wherein the buffer memory interface is an interface to static random access memory.

* * * * *